United States Patent
Teranishi et al.

(10) Patent No.: US 9,713,119 B2
(45) Date of Patent: Jul. 18, 2017

(54) POSITION ESTIMATION METHOD, SYSTEM, AND POSITION ESTIMATION APPARATUS

(71) Applicant: FUJITSU LIMITED, Kawasaki-shi, Kanagawa (JP)

(72) Inventors: Yuta Teranishi, Kawasaki (JP); Koichiro Yamashita, Kawasaki (JP); Takahisa Suzuki, Kawasaki (JP); Hiromasa Yamauchi, Kawasaki (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 14/599,029

(22) Filed: Jan. 16, 2015

(65) Prior Publication Data

US 2015/0126232 A1 May 7, 2015

Related U.S. Application Data

(63) Continuation of application No. PCT/JP2012/068251, filed on Jul. 18, 2012.

(51) Int. Cl.
*H04W 64/00* (2009.01)
*G01S 5/02* (2010.01)
(Continued)

(52) U.S. Cl.
CPC ......... *H04W 64/006* (2013.01); *G01S 5/0278* (2013.01); *G01S 5/0284* (2013.01);
(Continued)

(58) Field of Classification Search
CPC .............................. H04W 84/18; H04W 64/00
See application file for complete search history.

(56) References Cited

U.S. PATENT DOCUMENTS 5,412,654 A 5/1995 Perkins
2005/0228613 A1* 10/2005 Fullerton .............. G01S 5/0289
342/458

(Continued)

FOREIGN PATENT DOCUMENTS

JP 2006-229845 8/2006
JP 2007-043636 2/2007
(Continued)

OTHER PUBLICATIONS

Extended European Search Report dated Jul. 2, 2015 in corresponding European Patent Application No. 12881486.0.
(Continued)

*Primary Examiner* — Nathan Mitchell
*Assistant Examiner* — Ernest Tacsik
(74) *Attorney, Agent, or Firm* — Staas & Halsey LLP

(57) ABSTRACT

A position estimation apparatus acquires, for base devices, the number of hops from a target sensor node to a base device. The position estimation apparatus calculates, for each base device, a distribution of estimated distances corresponding to the total hops, based on the number of hops and a distribution of estimated distances stored in a storage device. The position estimation apparatus calculates, for each base device, a distribution of estimated positions within a given region, based on the distribution of estimated distances, information concerning a range of the given region, and information concerning a position of the base device. The position estimation apparatus calculates an index that indicates a probability of a position of the target sensor node within the given region, based on the sum of distributions of estimated positions concerning the base stations.

10 Claims, 28 Drawing Sheets

(51) Int. Cl.
  *H04W 4/00* (2009.01)
  *H04W 84/18* (2009.01)
  *H04L 29/08* (2006.01)

(52) U.S. Cl.
  CPC .......... *H04W 64/00* (2013.01); *G01S 5/0289* (2013.01); *H04L 67/12* (2013.01); *H04W 4/005* (2013.01); *H04W 84/18* (2013.01)

(56) References Cited

U.S. PATENT DOCUMENTS

| | | | |
|---|---|---|---|
| 2008/0014963 A1 | 1/2008 | Takizawa et al. | |
| 2009/0073924 A1* | 3/2009 | Chou | H04L 45/20 370/328 |
| 2010/0246438 A1 | 9/2010 | Potkonjak | |

FOREIGN PATENT DOCUMENTS

| | | |
|---|---|---|
| JP | 2007-221541 | 8/2007 |
| JP | 2007-271444 | 10/2007 |
| JP | 2010-190629 | 9/2010 |

OTHER PUBLICATIONS

Hernandez et al., "Maximum Likelihood Position Estimation in Ad-Hoc Networks Using a Dead Reckoning Approach", IEEE Transactions on Wireless Communications, vol. 7, No. 5, May 2008, pp. 1572-1584.

International Search Report mailed Aug. 14, 2012 in corresponding international application PCT/JP2012/068251.

L.A.Anto Gracious et al. "Multihop Distance Estimation with Greedy Approach in Wireless Sensor Networks" Emerging Trends in Electrical and Computer Technology(ICETECT),2011 International Conference on, IEEE, Mar. 2011, Abstract, V.Numarical Result.

S.Vural et al. "On Multihop Distances in Wireless Sensor Networks with Random Node Locations" Mobile Computing, IEEE Transactions on, Apr. 2010, 3.3 Analysis of Single hop Maximum Distance.

* cited by examiner

FIG.23

| SENSOR ID | LEAST HOPS TO BASE DEVICE 1 | LEAST HOPS TO BASE DEVICE 2 | LEAST HOPS TO BASE DEVICE 3 | |
|---|---|---|---|---|
| 1 | ... | ... | ... | ~ 2301-1 |
| 2 | ... | ... | ... | ~ 2301-2 |
| 3 | ... | ... | ... | |
| 4 | ... | ... | ... | |
| ... | ... | ... | ... | |
| ... | ... | ... | ... | |
| ... | ... | ... | ... | |
| ... | ... | ... | ... | |

FIG.24

| SENSOR ID | ONE-HOP RANGE SENSOR ID | |
|---|---|---|
| 1 | 2, 13, 45, 21 | ~ 2401-1 |
| 2 | 1, 21, 100 | |
| 3 | 5 | |
| ... | ... | |

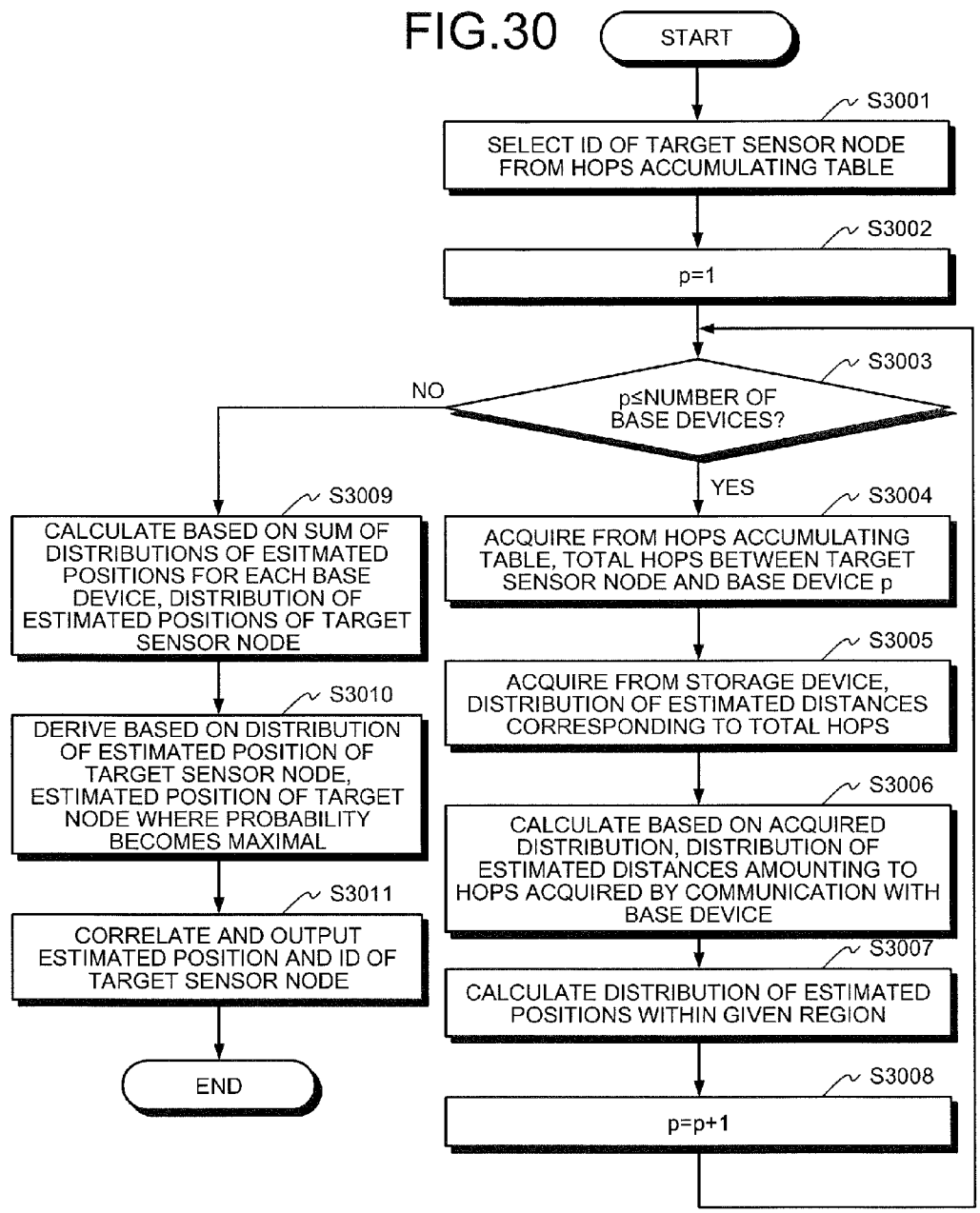

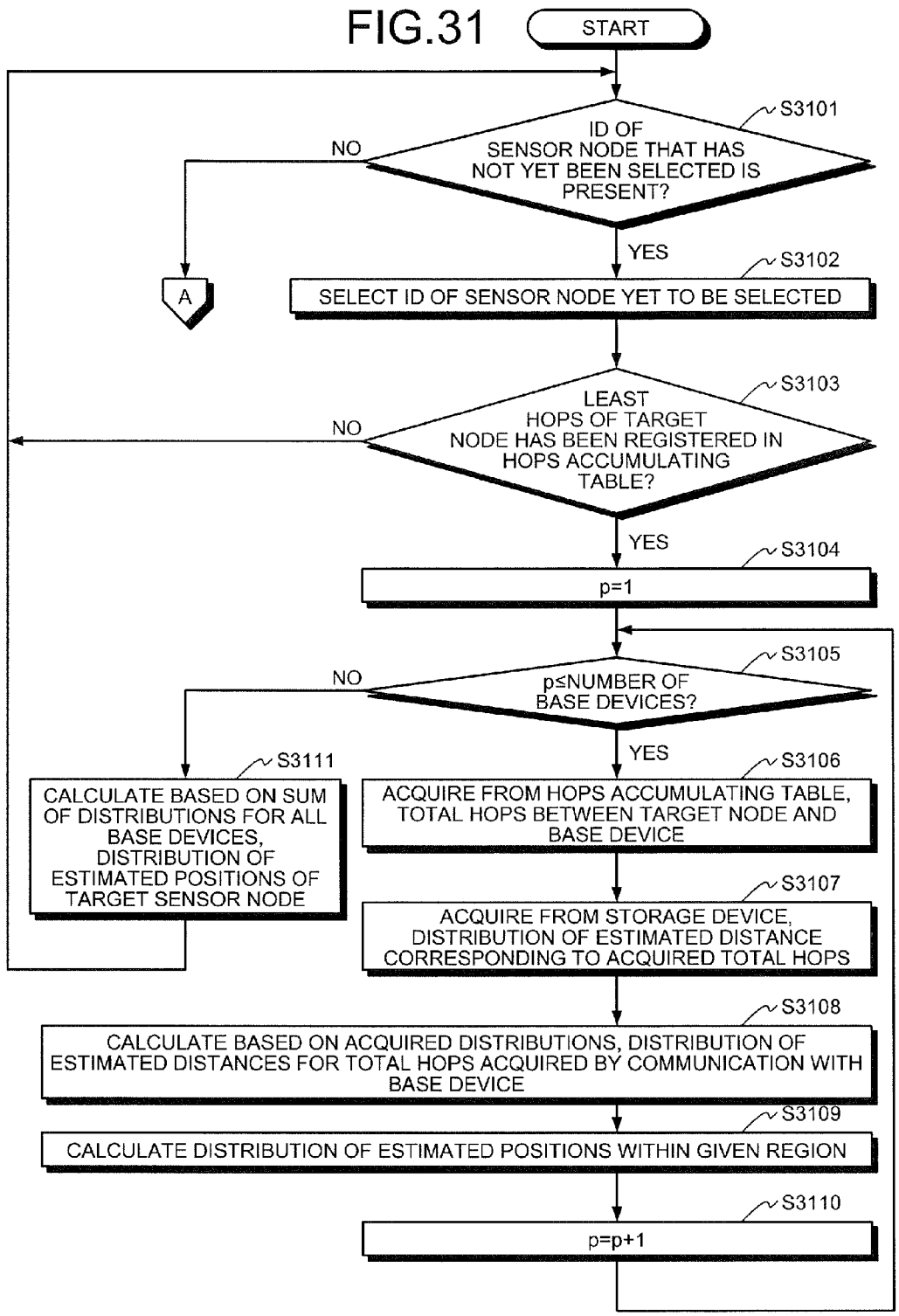

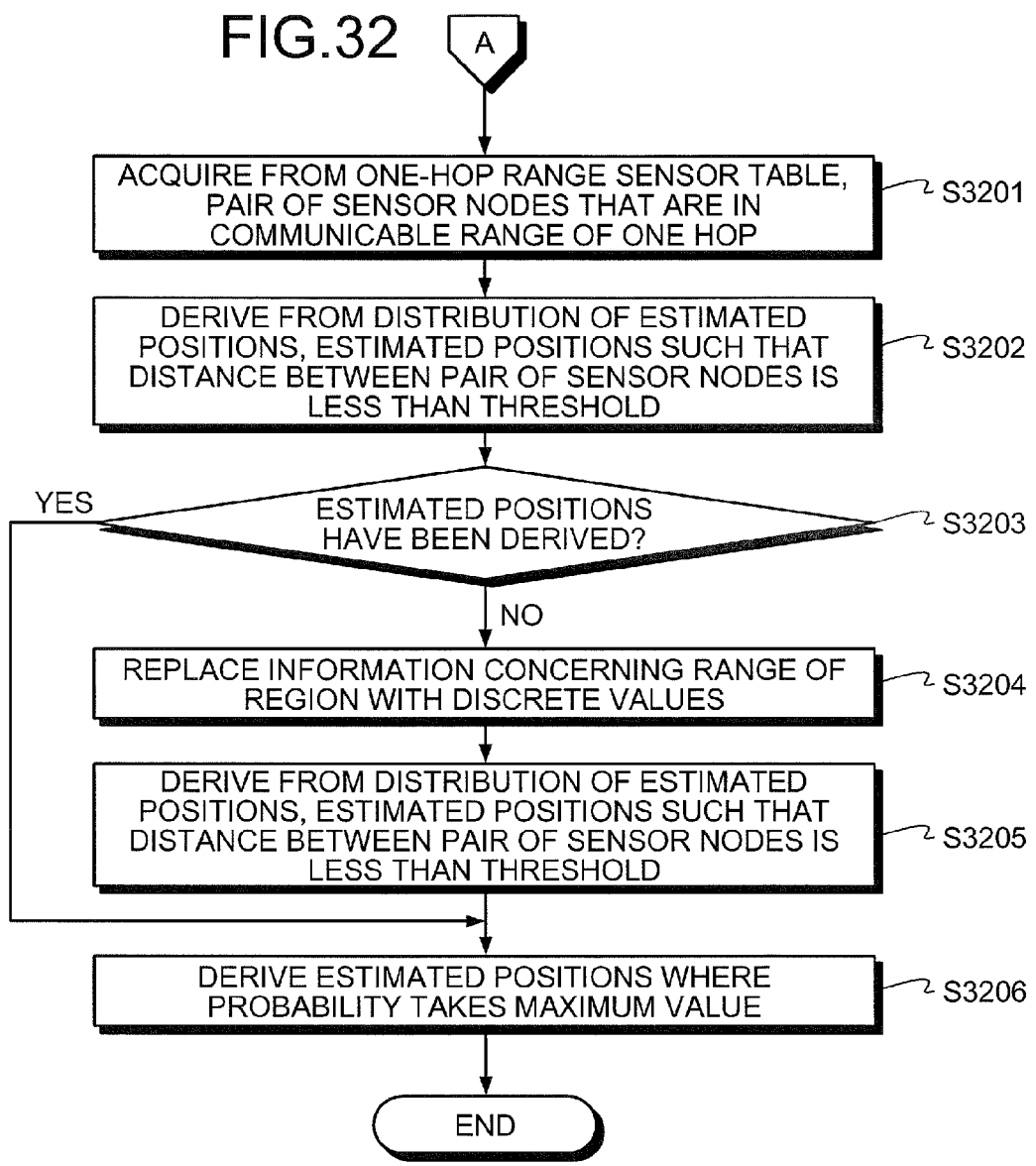

POSITION ESTIMATION METHOD, SYSTEM, AND POSITION ESTIMATION APPARATUS

CROSS REFERENCE TO RELATED APPLICATIONS

This application is a continuation application of International Application PCT/JP2012/068251, filed on Jul. 18, 2012 and designating the U.S., the entire contents of which are incorporated herein by reference.

FIELD

The embodiments discussed herein are related to a position estimation method, a system, and a position estimation apparatus.

BACKGROUND

A method is known that when the positions of communication devices are unknown, a target communication device is located by finding a communication path from the target communication device to a communication device whose position is known. For example, the position of a node is estimated based on the distance between adjacent nodes on the communication path, the distance being measured with the strength or delay of radio waves (see Japanese Laid-open Patent Publication No. 2007-221541). Alternatively, communication paths up to nodes whose positions are known are specified and an approximate position of a node is estimated based on the number of hops over each communication path, a communication-cable distance by one hop, and positional information of the nodes whose positions are known (see Japanese Laid-open Patent Publication No. 2006-229845).

However, there are cases where the position of a communication device cannot be estimated accurately due to the communication environment or the positioning of communication devices.

SUMMARY

According to an aspect of an embodiment, a position estimation method is performed by a computer that accesses a storage device. The method includes storing to the storage device, a probability distribution of distances corresponding to a hop along a path between a first communication device and a second communication device within a region; acquiring total hops needed for data of the second communication device to reach the first communication device based on analysis of communications between the first communication device and the second communication device; calculating a probability distribution of distances corresponding to the total hops based on the total hops and the probability distribution of a hop stored in the storage device; calculating a probability distribution of positions within the region based on the probability distribution of distances, information concerning a range of the region, and information concerning a position of the first communication device; calculating, based on a sum of the probability distribution of positions, an index that indicates a probability of presence of the second communication device; and deriving an estimated position of the second communication device from the index.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 23 is a diagram depicting a hops accumulating table;

FIG. 24 is a diagram depicting a one-hop range sensor table;

FIG. 30 is a flowchart depicting a first example of the position estimation process performed by the position estimation apparatus; and FIG. 31 and FIG. 32 are flowcharts depicting a second example of the position estimation process performed by the position estimation apparatus.

DESCRIPTION OF EMBODIMENTS

With reference to the accompanying drawings, preferred embodiments of a position estimation method, system, and position estimation apparatus are described. A sensor network of the embodiments includes many sensors disposed within a given region. Each sensor detects and wirelessly transmits information. A base device which wirelessly communicates with sensors in the given region collects the information. The given region is, for example, a region filled with materials such as concrete, soil, water, and air. The given region may be a vacuum space like a cosmic space. A node is defined as a device that has a sensor and a processor that processes data detected by the sensor. For example, hundreds to tens of thousands of sensor nodes are disposed in the given region.

Figure 1:
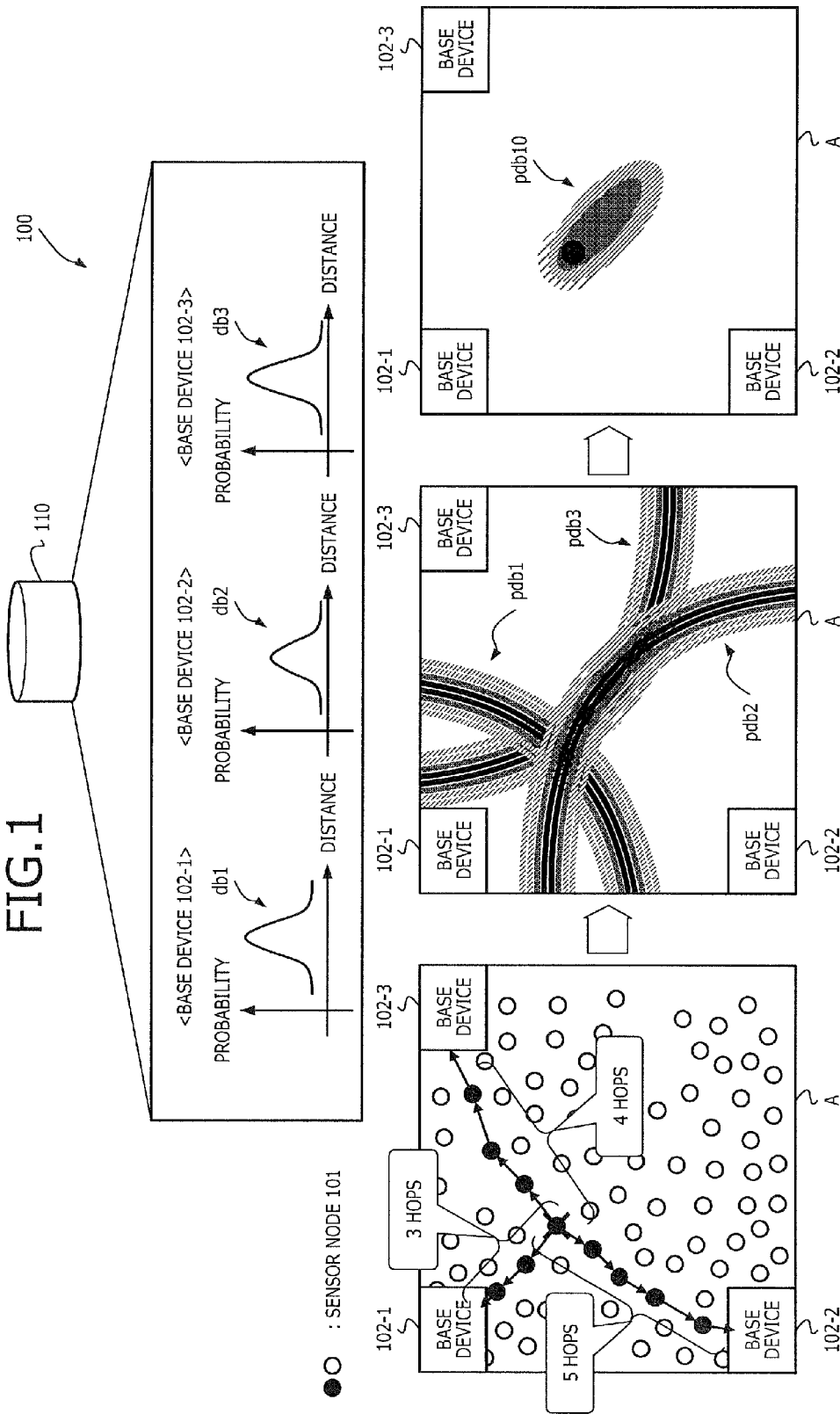
FIG. 1 is a diagram depicting an example of operation of the embodiments.

FIG. 1 is a diagram depicting an example of operation of the embodiments. A position estimation apparatus 100 accesses a storage device 110 and is a computer that has a function of estimating positions of sensor nodes 101-1 to 101-n, which are second communication devices, within a given region A. Each sensor node 101 is disposed in the given region A by, for example, being distributed in the given region A or mixed with substances that fill the given region A. Thus, the position of each sensor node 101 is unknown.

Base devices 102-1 to 102-m, acting as first communication devices, are disposed at given positions (in the case of FIG. 1, m=3). The given positions are, for example, those determined by a user or a designer of the sensor network. The given positions may be within the given region A. The base devices 102 may be arranged surrounding the given region A. The base devices 102 do not occupy the same position.

According to wireless communication of the embodiments, the sensor nodes 101 communicate each other performing multi-hop communication. For example, each sensor node 101 directly transmits data to or receives data from a base device 102. When a sensor node 101 is so far from the base device 102 that communication cannot be established, each sensor node 101 transmits a radio signal to an adjacent data processing device and relays data to the adjacent data processing device. For this reason, each sensor node 101 has a wireless communication circuit with a small output power sufficient for communication with an adjacent sensor node, thereby reducing the size and the power consumption of the sensor node 101.

Figure 19:
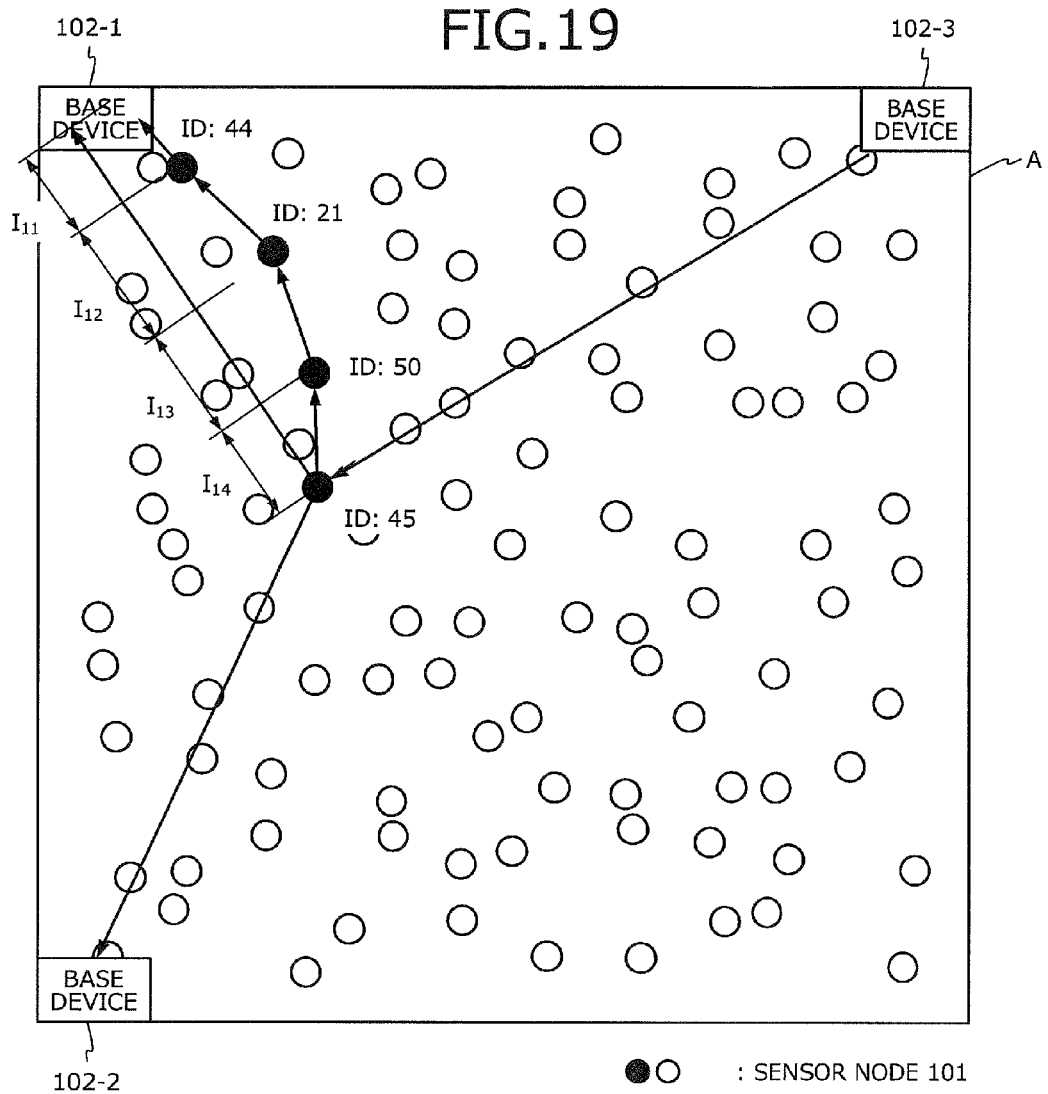
FIG. 19 is a diagram depicting an example of distance calculation.

A storage device 110 stores, for each base device, a probability distribution of estimated distances corresponding to a hop of a path of wireless communication between each sensor node 101 and the base device 102, e.g., I11 to I14 in FIG. 19. For example, a probability distribution is illustrated with the horizontal axis being the distance that data approaches the base device by one hop and the vertical axis being the probability or frequencies of the distance generated by simulation. A detailed description of the simulation will be given later. In FIG. 1, the probability distribution of estimated distances for a base device 102-1 is called db1, for a base device 102-2: db2, and for a base device 102-3: db3.

The position estimation apparatus 100 acquires, for each base device, total hops, the number of hops that data from a sensor node 101 under consideration need to pass through to reach the base device 102. The total hops indicate how many times data are relayed.

The position estimation apparatus 100 calculates, for each base device, a probability distribution of estimated distances corresponding to the total hops between a base device and a sensor node under consideration based on the total hops and the probability distributions of estimated distances concerning the base device 102 stored in the storage device 110.

The position estimation apparatus 100 calculates, for each base device 102, a probability distribution of estimated positions within the given region A based on the probability distribution of estimated distances, information concerning the range of the given region A, and positional information of the base devices 102. FIG. 1 depicts probability distributions of estimated positions within the given region A for each base device 102. A probability distribution of estimated positions within the given region A for the base device 102-1 is called pdb1, for the base device 102-2: pdb2, and for the base device 102-3: pdb3. Darker color indicates higher probability and fainter color indicates lower probability.

Based on the sum of the probability distributions of estimated positions, the position estimation apparatus 100 calculates an index that indicates the probability of the position of a sensor node 101 under consideration. On the right side of FIG. 1, the index within the given region A is depicted as the probability distribution pdb10. Darker color indicates higher probability and fainter color indicates lower probability. An area in a central part of FIG. 1 where three probability distributions overlap corresponds to a darker area on a right side of FIG. 1.

The position estimation apparatus 100 derives an estimated position of a sensor node 101 under consideration from the index. The largest index may be regarded as the estimated position of the sensor node 101.

According to FIG. 1, the accuracy of position estimation of a sensor node is improved.

Figure 2:
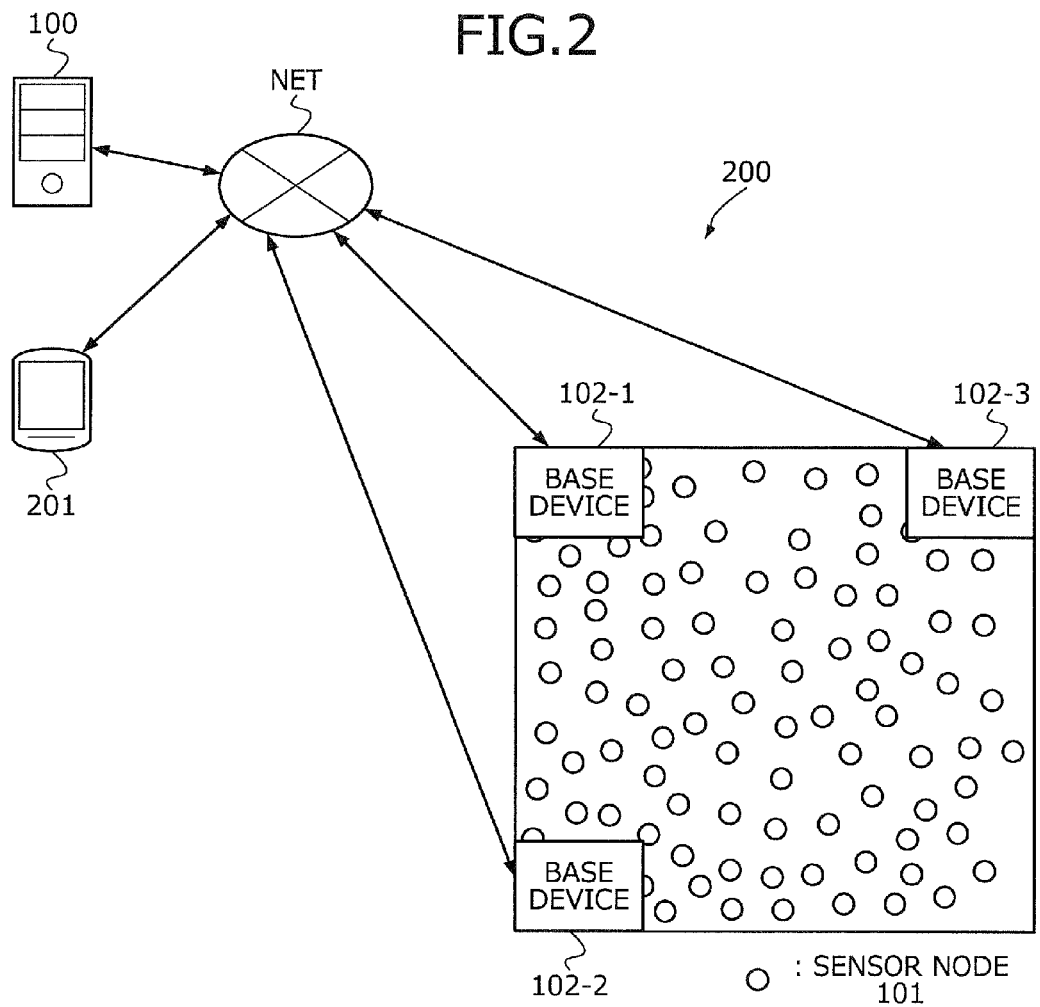
FIG. 2 is a diagram depicting one example of a sensor network system.

FIG. 2 is a diagram depicting one example of the sensor network system. The sensor network system 200 includes base devices 102, sensor nodes 101, the position estimation apparatus 100, and a user terminal 201. The base devices 102, the position estimation apparatus 100, and the user terminal 201 are connected via a network NET.

Figure 3:
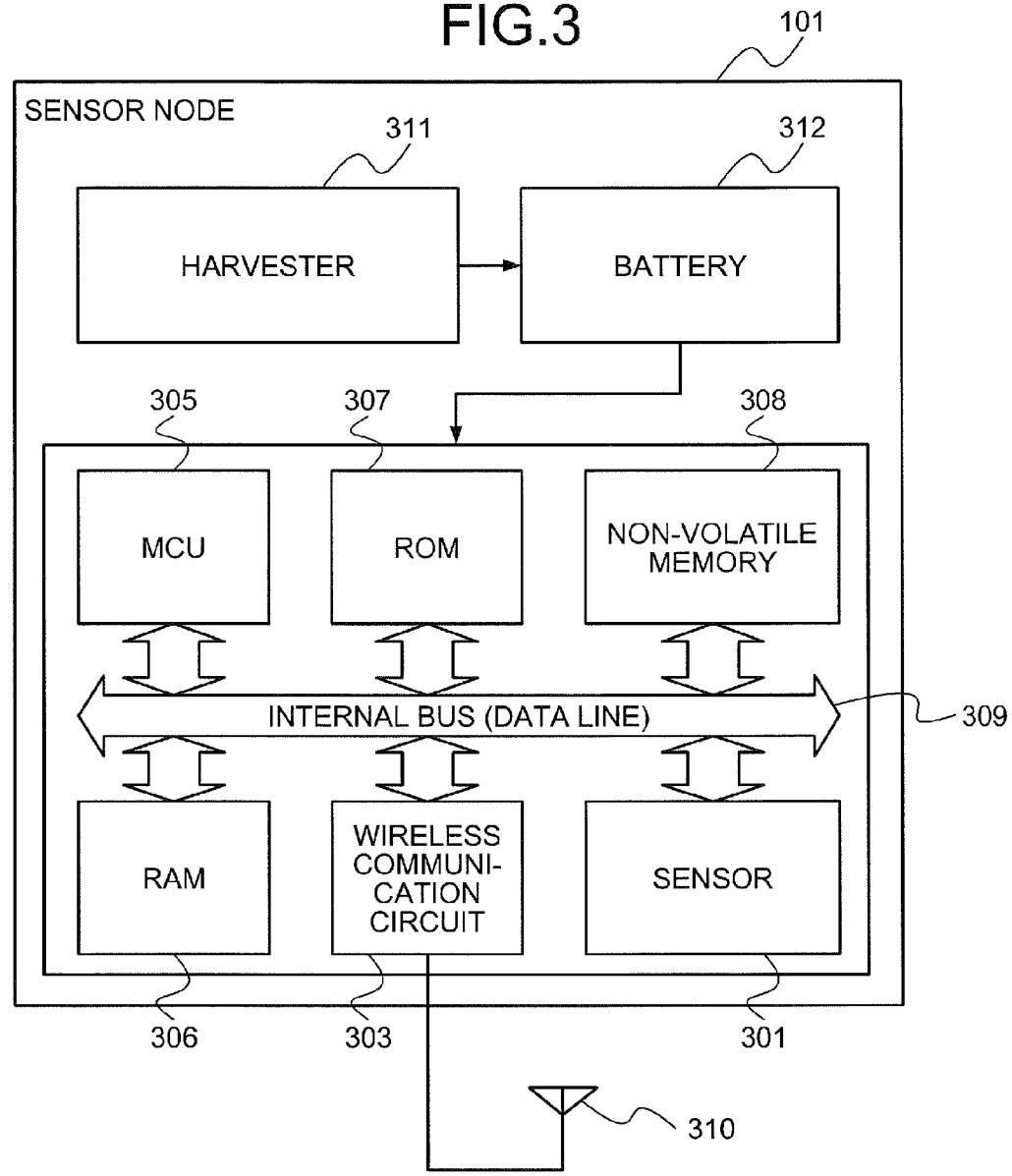
FIG. 3 is a diagram depicting an internal structure of a sensor node.

FIG. 3 is a diagram depicting an internal structure of the sensor node. The sensor node 101 acting as a second communication device includes a sensor 301, a wireless communication circuit 303, a microprocessor (micro control unit (MCU)) 305, and a random access memory (RAM) 306. The sensor node 101 includes a read only memory (ROM) 307, a non-volatile memory 308, an antenna 310, a harvester 311, and a battery 312.

The sensor 301 detects a change of a physical quantity at the position where the sensor 301 is located. The sensor 301 may be a piezoelectric element that detects pressure at the position or a photoelectric element that detects light. The antenna 310 transmits and receives radio waves. The wireless communication circuit (RF) 303 outputs the received radio waves as a signal and transmits a signal via the antenna 310 as radio waves.

The MCU 305 processes data detected by the sensor 301. The RAM 306 stores transient data of the processing by the MCU 305. The ROM 307 stores a processing program executed by the MCU 305. The non-volatile memory 308 stores written data even if the power supply is suspended. Elements of the sensor 301 to the non-volatile memory 308 are connected via a bus 309.

The sensor node 101 includes the harvester 311 and the battery 312. The harvester 311 generates electric power based on the change of environmental conditions such as light, vibration, temperature, radio wave (received wave). The battery 312 stores the electric power generated by the harvester 311 and supplies each element of the sensor node 101 with the electric power. The sensor node 101 does not require a rechargeable battery or an external power source. The sensor node 101 generates necessary electric power by itself.

Figure 4:
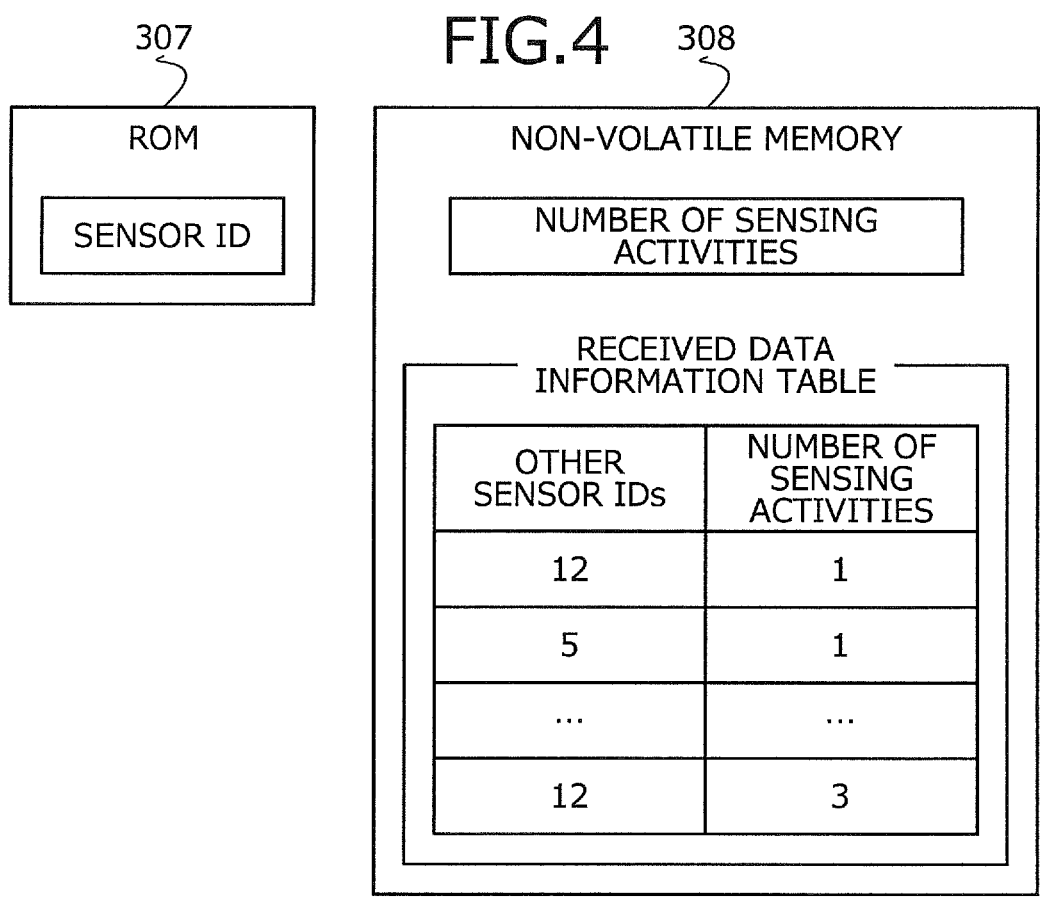
FIG. 4 is a diagram depicting data stored in a ROM and a non-volatile memory.

FIG. 4 is a diagram depicting data stored in the ROM and the non-volatile memory. The ROM 307 stores, in addition to the processing program mentioned above, a sensor ID which distinguishes the sensor node 101 from the other sensor nodes.

The non-volatile memory 308 stores the number of sensing activities and a received data information table. The number of sensing activities indicates how many times the sensing has been performed to acquire data. As a result, data detected by the sensor is identified.

The received data information table possesses information concerning data received by the sensor node 101 from other sensor nodes 101. For example, the received data information table includes fields of sensor ID and the number of sensing activities. The sensor ID field receives information concerning which sensor node has detected the data. The sensing activities field receives the number of sensing activities needed to detect the data received by the sensor node 101. These fields are stored as a record.

Figure 5:
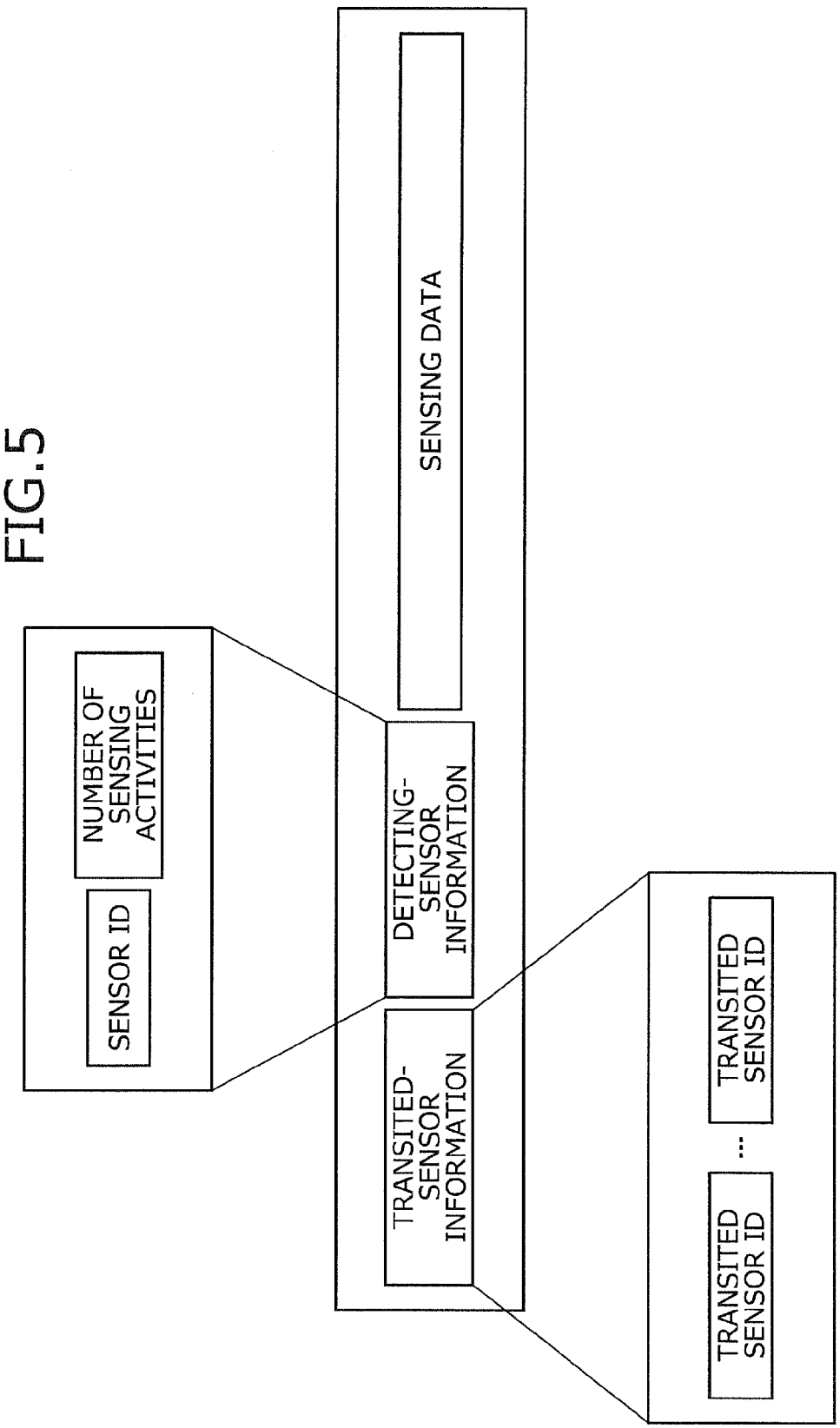
FIG. 5 is a diagram depicting a structure of transmission data of the sensor node.

FIG. 5 is a diagram depicting a structure of transmission data of the sensor node. The transmission data of the sensor node 101 includes, for example, transited-sensor information, detecting-sensor information, and sensing data. The transited-sensor information is information concerning sensor nodes through which data has been carried to the base device 102. The detecting-sensor information identifies sensing data. The detecting-sensor information includes the number of sensing activities and the sensor ID that indicates which sensor node has detected the data.

Figure 6:
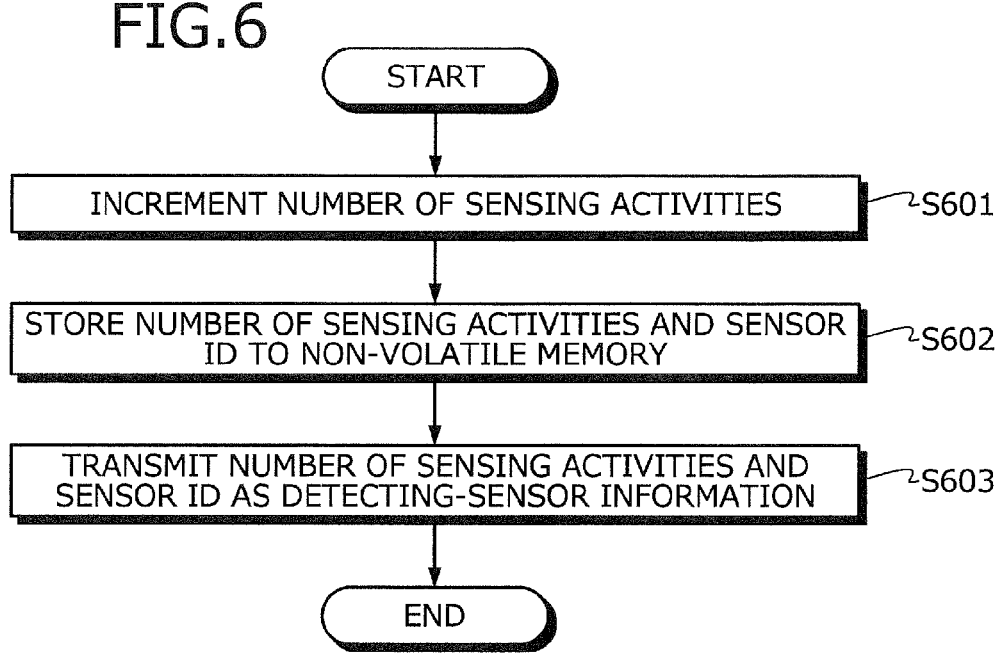
FIG. 6 is a flowchart depicting a process of sensing performed by a sensor node.

FIG. 6 is a flowchart depicting a process of sensing by a sensor node. When the sensor of the sensor node 101 performs the sensing, the sensor increments the number of sensing activities (step S601) and stores the number of sensing activities and the sensor ID in the received data information table of the non-volatile memory 308 (step S602). The sensor node 101 transmits the number of sensing activities and the sensor ID as the detecting-sensor information (step S603) and the process ends.

Figure 7:
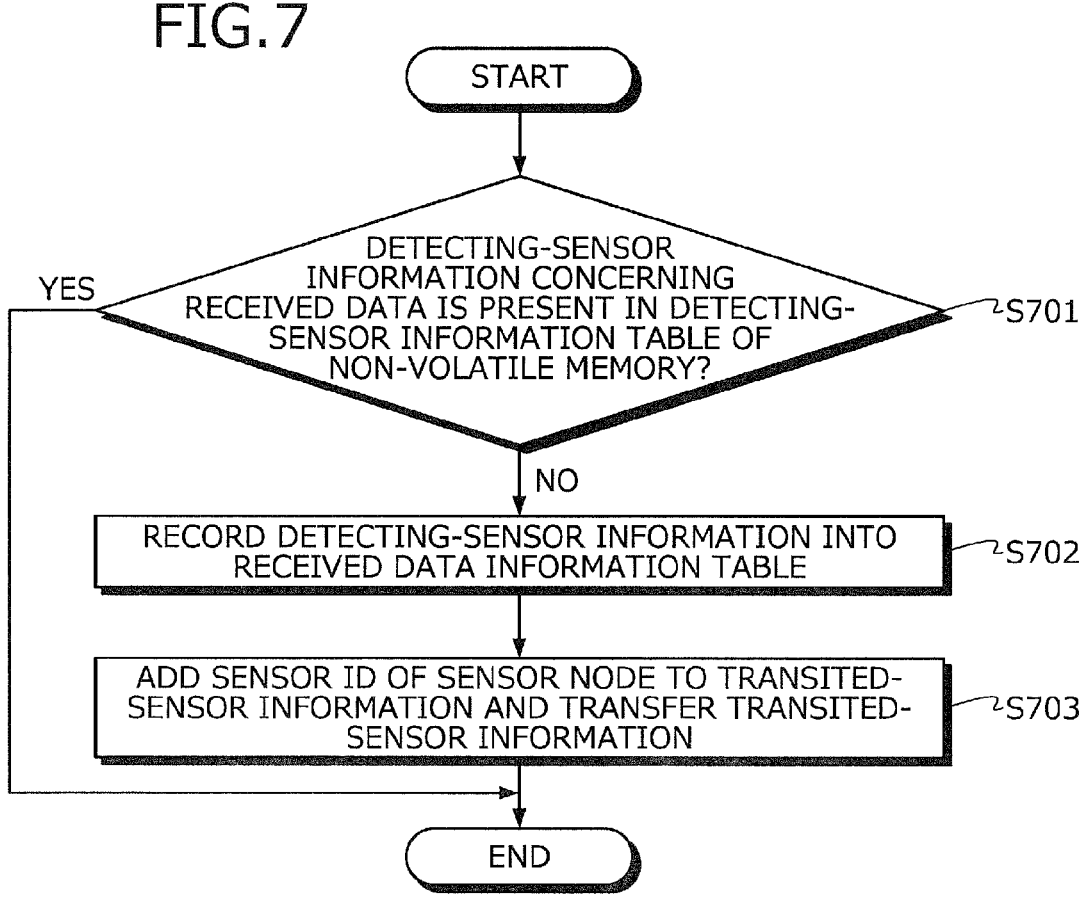
FIG. 7 is a flowchart depicting a process of data receiving performed by a sensor node.

FIG. 7 is a flowchart depicting a process of the data receiving performed by a sensor node. The sensor node 101 determines whether detecting-sensor information concerning the received data is present in the detecting-sensor information table of the non-volatile memory 308 (step S701). If the information is not present in the table (step S701: NO), the sensor node 101 records the detecting-sensor information into the received data information table (step S702).

The sensor node 101 adds the sensor ID to the transited-sensor information and transfers the transited-sensor information (step S703), and the process ends. If the information is present in the table at step S701 (step S701: YES), the process ends. In this way, one sensor does not repeatedly receive the same data.

Figure 8:
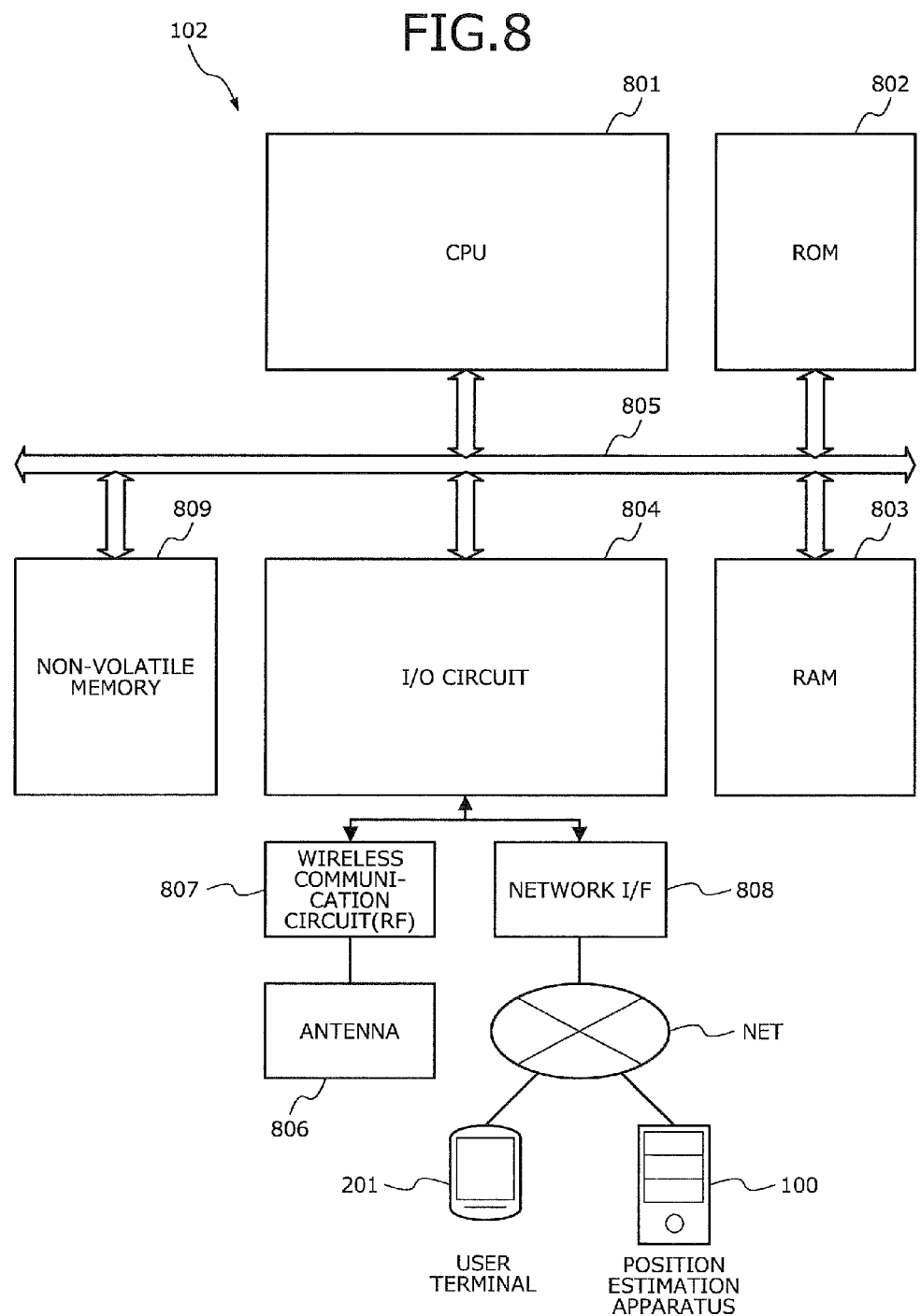
FIG. 8 is a diagram depicting an internal structure of a base device.

FIG. 8 is a diagram depicting an internal structure of a base device. The base device 102 acting as the first communication device receives power from an external source unlike the sensor node 101. The base device 102 includes a central processing unit (CPU) 801 that is a higher performance processor than the MCU 305 of the sensor node 101, a high-capacity ROM 802, and a high-capacity RAM 803. The base device 102 also includes non-volatile memory 809, an interface input/output (I/O) circuit 804, and a bus 805 connecting the CPU 801 to the I/O circuit 804 and the non-volatile memory 809.

The I/O circuit 804 is connected to an antenna 806, a wireless communication circuit RF (radio frequency) 807, and a network I/F 808. The base device 102 communicates with an external device such as the position estimation apparatus 100 or the user terminal 201 through the network NET such as the Internet with the aid of the network I/F 808 using the TCP/IP protocol.

Figure 9:
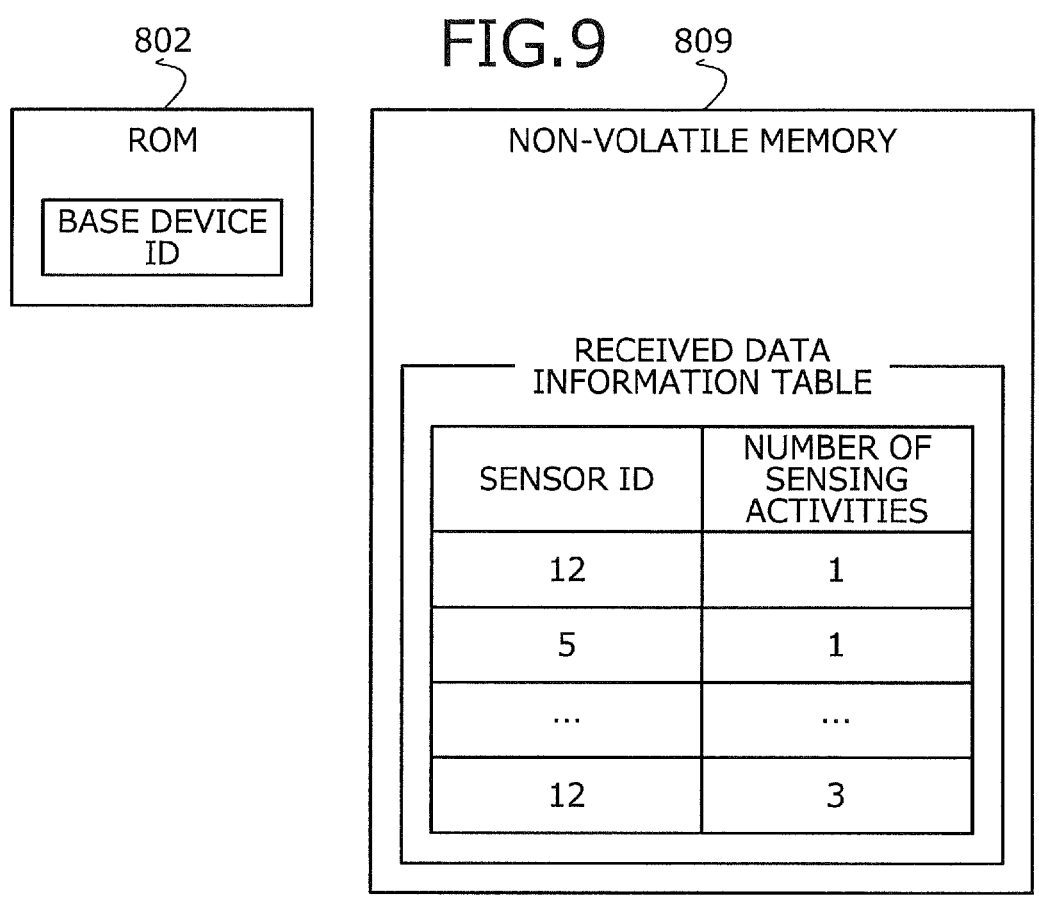
FIG. 9 is a diagram depicting data stored in a ROM and a non-volatile memory of the base device.

FIG. 9 is a diagram depicting data stored in the ROM and the non-volatile memory of the base device. In addition to a processing program concerning the process performed by the base device 102, the ROM 802 stores a base device ID that is identification information for the base device 102.

The non-volatile memory 809 stores, for example, a received data information table. The received data information table is information concerning data received from the sensor node 101. For example, the received data information table includes fields of sensor ID and the number of sensing activities. The sensor ID field receives identification information that indicates which sensor node has detected data. The field of the number of sensing activities receives the number of sensing activities concerning the received data. These fields are stored as a record.

Figure 10:
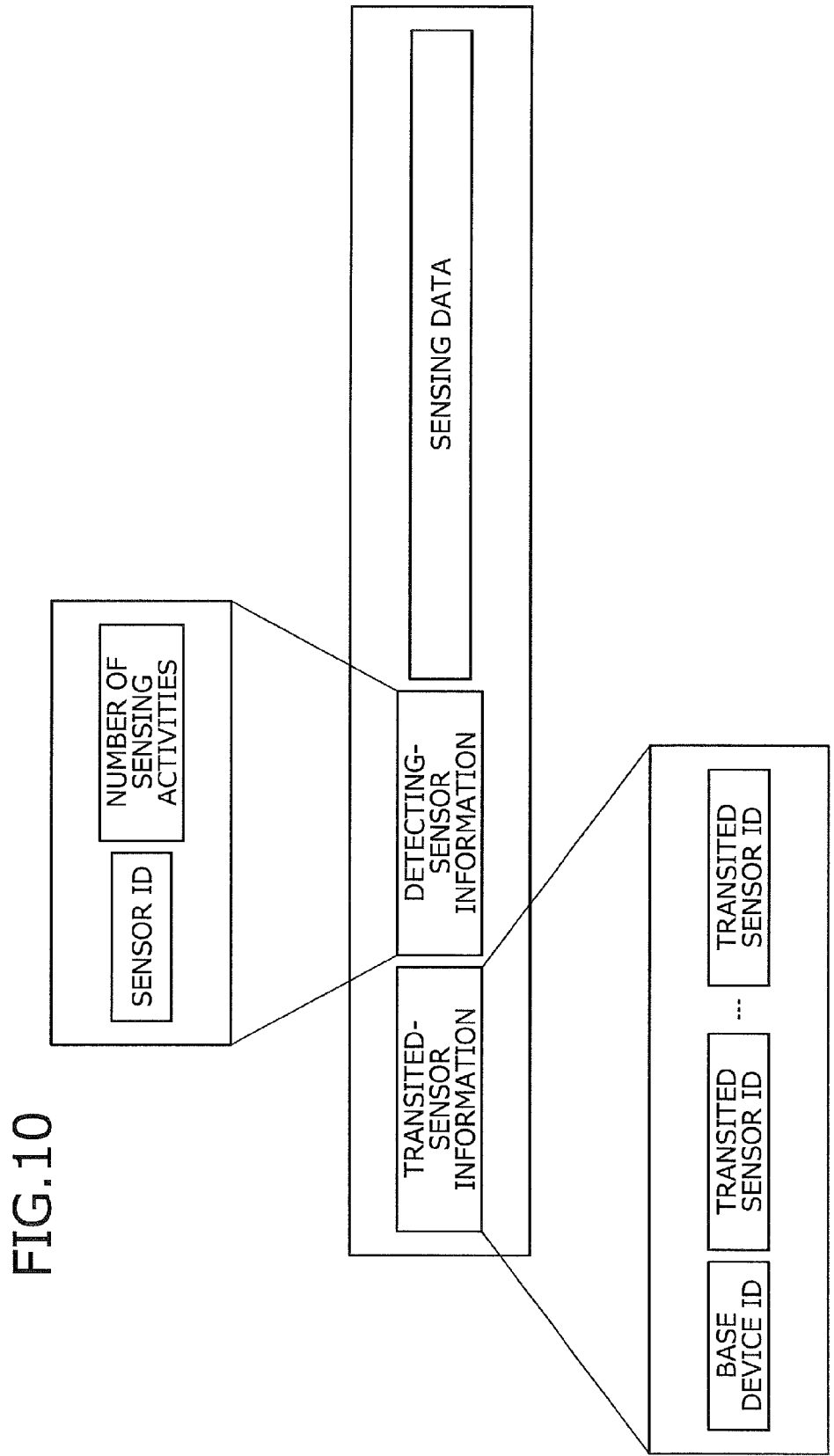
FIG. 10 is a diagram depicting a structure of transmission data of the base device.

FIG. 10 is a diagram depicting a structure of transmission data of the base device. The transmission data of the base device 102 includes, for example, transited-sensor information, detecting-sensor information, and sensing data. The transited-sensor information is used to determine through which sensor the data has been transferred before reaching the base device 102. The detecting-sensor information is used to identify sensing data. The detecting-sensor information includes the number of sensing activities and a sensor ID that indicates which sensor node has detected the data.

Figure 11:
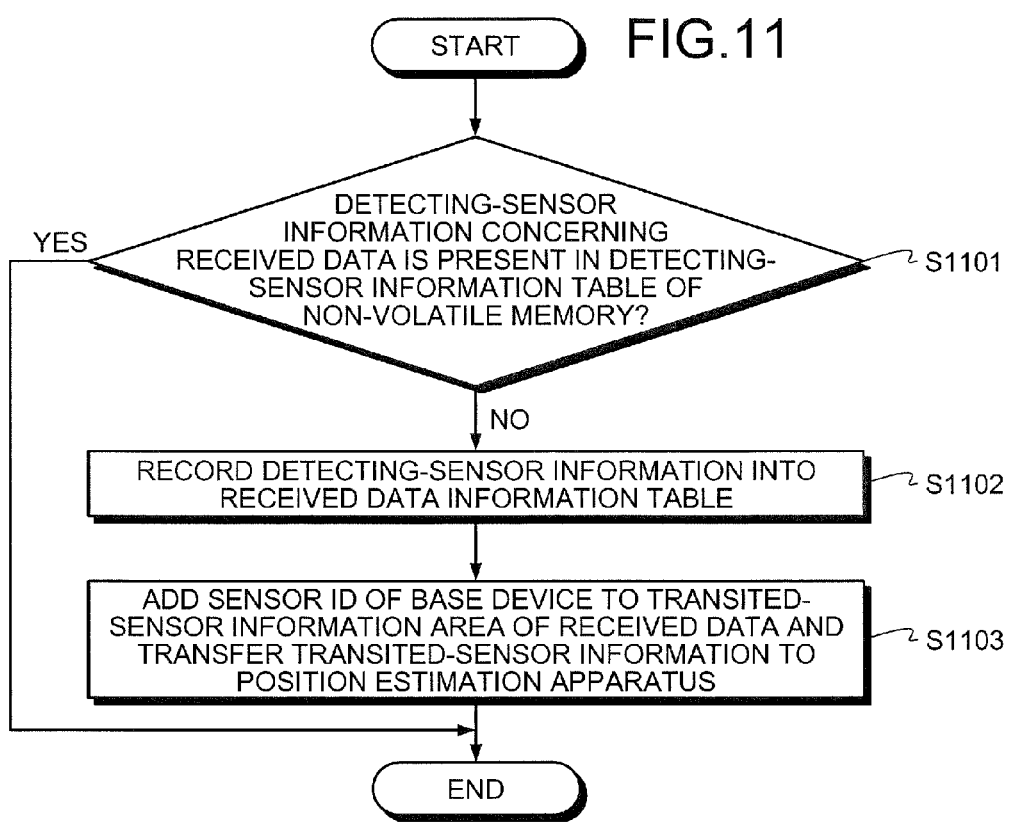
FIG. 11 is a flowchart depicting a process performed by the base device.

FIG. 11 is a flowchart depicting a process performed by the base device. The base device determines whether detecting-sensor information concerning the received data is present in the detecting-sensor information table of the non-volatile memory 809 (step S1101). If the information is not present in the table (step S1101: NO), the base device records the detecting-sensor information in the received data information table (step S1102).

The base device adds the base device ID to the transited-sensor information area of the received data and transfers the information to the position estimation apparatus 100 (step S1103), and the process ends. At step S1101, if the information is present in the table (step S1101: YES), the process ends.

Figure 12:
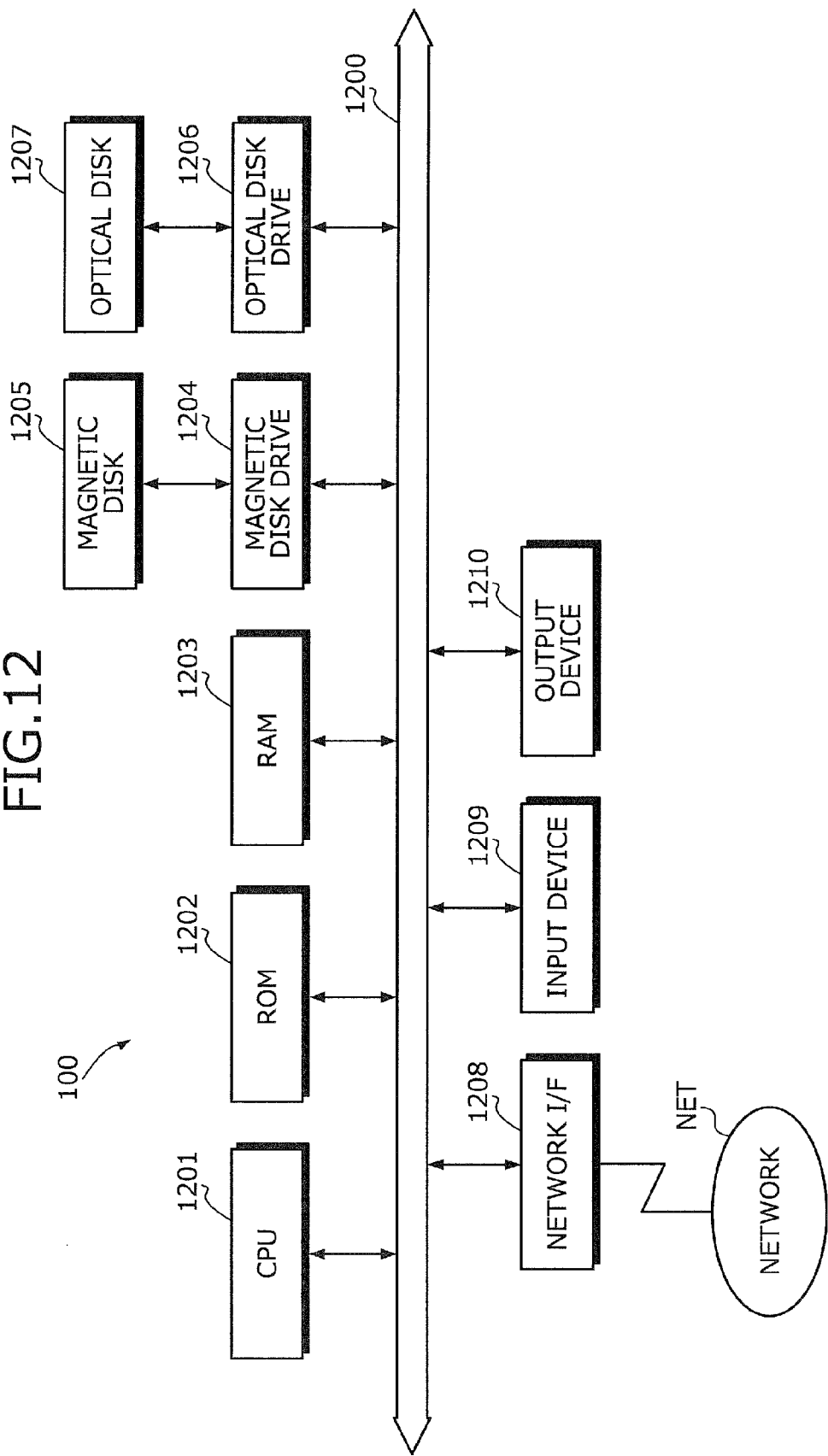
FIG. 12 is a diagram depicting a hardware configuration of a position estimation apparatus.

FIG. 12 is a diagram depicting a hardware configuration of the position estimation apparatus. In FIG. 12, the position estimation apparatus 100 includes a CPU 1201, ROM 1202, RAM 1203, a magnetic disk drive 1204, a magnetic disk 1205, an optical disk drive 1206, and an optical disk 1207. The position estimation apparatus 100 also includes a network I/F 1208, an input device 1209, and an output device 1210. The constituent units above are connected through a bus 1200.

The CPU 1201 governs over all control of the position estimation apparatus 100. The ROM 1202 stores therein various programs such as a boot program. The RAM 1203 is used as a working area of the CPU 1201. The magnetic disk drive 1204 controls the reading and writing of data with respect to the magnetic disk 305 under the control of the CPU 1201. The magnetic disk 1205 stores data written thereto under the control of the magnetic disk drive 1204.

The optical disk drive 1206 controls the reading and writing of the data with respect to the optical disk 1207 under the control of the CPU 1201. The optical disk 1207 stores data written thereto under the control of the optical disk drive 1206. A computer reads data from the optical disk 1207.

The network I/F 1208 is connected to the network NET such as a local area network (LAN), a wide area network (WAN), and the Internet through a communication line. The position estimation apparatus 100 is connected to other devices through the network NET. The network I/F 1208 functions as an interface between the position estimation apparatus 100 and the network NET and controls the input and output of data with respect to an external device. The network I/F 1208 may be a modem or a LAN adaptor.

The input device 1209 is an interface for entering various data through a keyboard, a mouse, a touch panel, etc. consequent to operation by a user. The input device 1209 may receive an image or a moving picture from a camera. The input device 1209 may also receive audio data from a microphone. The output device 1210 is an interface for outputting data under the control of the CPU 1201. The output device 1210 may be a display, a printer, etc.

Figure 13:
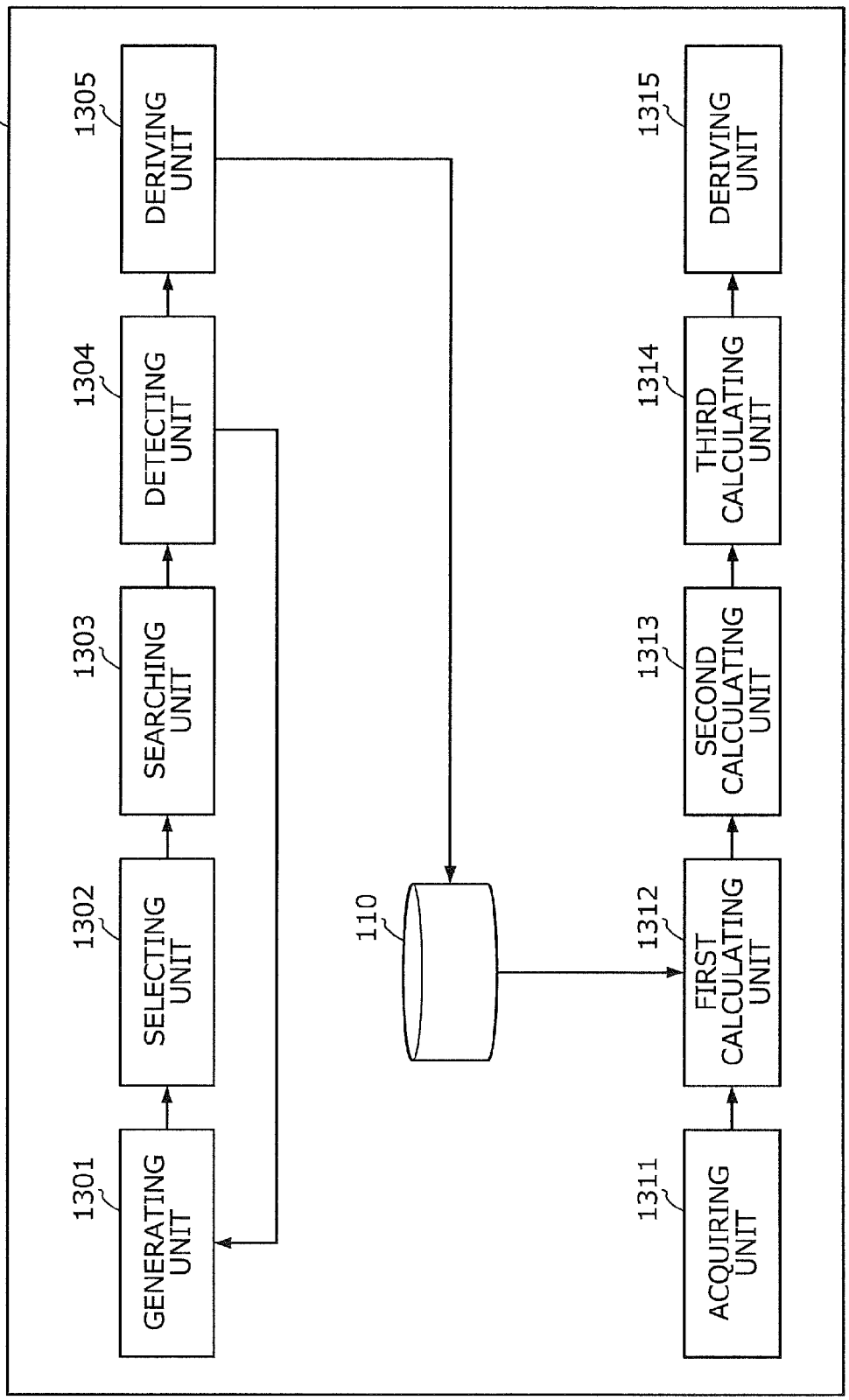
FIG. 13 is a diagram depicting a functional configuration of the position estimation apparatus.

FIG. 13 is a diagram depicting a functional configuration of the position estimation apparatus. The position estimation apparatus 100 includes a generating unit 1301, a selecting unit 1302, a searching unit 1303, a detecting unit 1304, and a deriving unit 1305. The position estimation apparatus 100 further includes an acquiring unit 1311, a first calculating unit 1312, a second calculating unit 1313, a third calculating unit 1314, and a deriving unit 1315. Processes concerning the generating unit 1301 to the deriving unit 1305 are performed before processes concerning the acquiring unit 1311 to the deriving unit 1315. For example, the processes concerning the generating unit 1301 to the deriving unit 1305 are performed in preparation for the operation of the sensor network system 200 and the processes concerning the acquiring unit 1311 to the deriving unit 1315 are performed during the operation of the sensor network system 200.

The processes concerning the generating unit 1301 to the deriving unit 1305 and concerning the acquiring unit 1311 to the deriving unit 1315 are coded into a position estimation program that is stored in a storage device such as the ROM 1202, the magnetic disk 1205, and the optical disk 1207. Each process is implemented by the CPU 1201 reading out the position estimation program from the storage device and executing the processes. The CPU 1201 may obtain a program from the network NET via the network I/F 1208.

As a preparation process for the operation of the sensor network system 200, the generation of a probability distribution of estimated distances by the generating unit 1301 to the deriving unit 1305 is explained. In this example, distances corresponding to hops are not equal.

Figure 14:
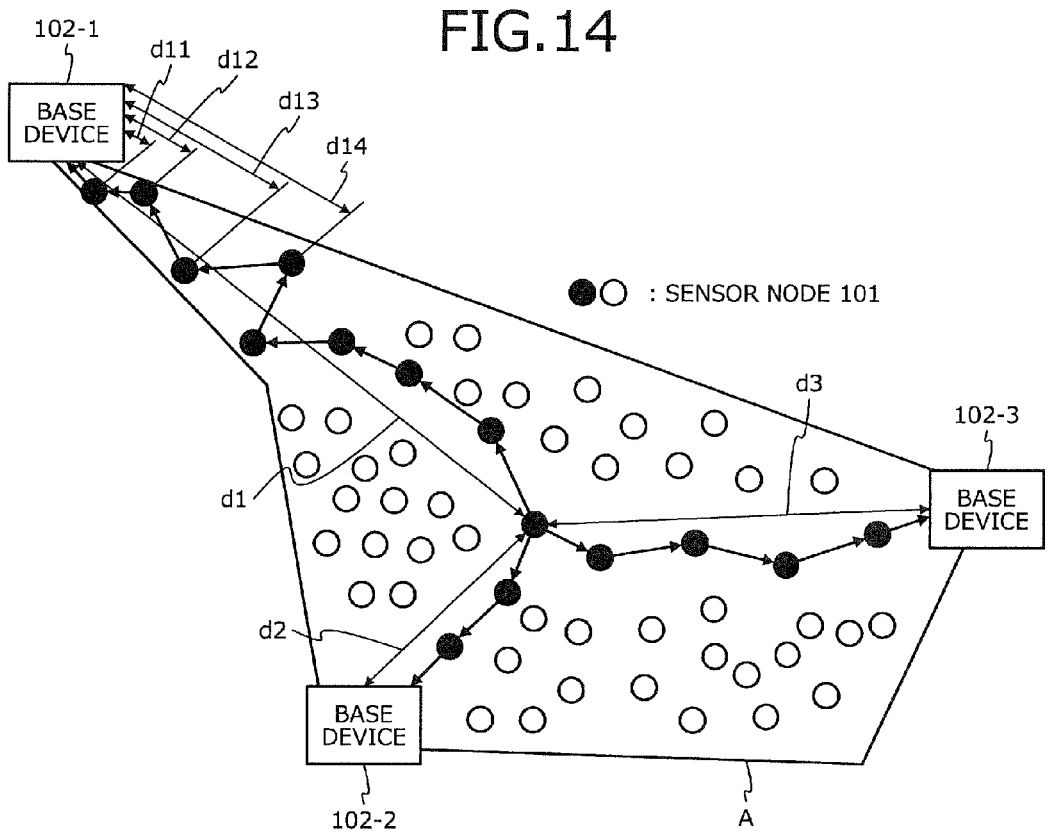
FIG. 14 is a diagram depicting a distance corresponding to a hop.

FIG. 14 is a diagram depicting a distance corresponding to a hop. A distance $d_3$ between a central sensor node 101 under consideration and the base device 102-3 is approximately twice as much as a distance $d_2$ between the sensor node 101 and the base device 102-2. The number of hops between the sensor node 101 and the base device 102-3 is less than twice the number of hops between the sensor node 101 and the base device 102-2. Even if the communicable distance of one hop that gives a communication range is multiplied by the number of hops, the resultant product does not locate the sensor node 101. This is because sensor nodes are not necessarily uniformly distributed within a region. Sensor nodes may concentrate at a particular area. As mentioned above, sensor nodes are distributed in a given region A, or mixed among substances that fill the given region A and distributed in the given region A. When an object such as a pillar is present within the given region A, there is an area void of a sensor node. As a result, the distances corresponding to hops (for example, $d_{11}$ to $d_{14}$) of a path from the sensor node to the base device 102-1 are not equal. In FIG. 14, the given region A takes a complex shape for an easy understanding of the distance corresponding to hops but the distances corresponding to hops are not equal irrespective of the shape of the given region A. For example, in a square region, a base device disposed at a corner and a base device disposed at a central part have different expected distances corresponding to a hop.

In this embodiment, the position estimation apparatus 100 simulates a communication path from sensor nodes within the given region A to the base devices 102. The position estimation apparatus 100 generates a probability distribution of hops of a path acquired by the simulation. The position estimation apparatus 100 handles the probability distribution as a probability distribution of estimated distances. In the end, based on the probability distribution of estimated distances and the number of hops known from actual communications, a more accurate probability distribution is obtained.

Example of input data is as below.
Position of base device 102-1: (0, 100)
Position of base device 102-2: (0, 0)
Position of base device 102-3: (100, 100)
Range of region A: $\{(x, y)|0 \leq x \leq 100, 0 \leq y \leq 100\}$
The number of sensor nodes: n
Communicable distance by one hop: r [m]

The communicable distance by one hop may be expressed with a probability distribution f(r) when the communicable distance is affected by surrounding conditions or the antenna has directivity.

The generating unit 1301 randomly generates position information that indicates positions of sensor nodes within the given region A. A designer of the sensor network system 200 may decide how many sensor nodes are generated.

The selecting unit 1302 selects one sensor node from among multiple sensor nodes. The sensor node may be selected from any place in the region A or from within a predetermined area.

The searching unit 1303 searches for a communication path from the selected sensor node to a base device based on the communicable distance covered by one hop, each time the position information is generated by the generating unit 1301.

Figure 15:
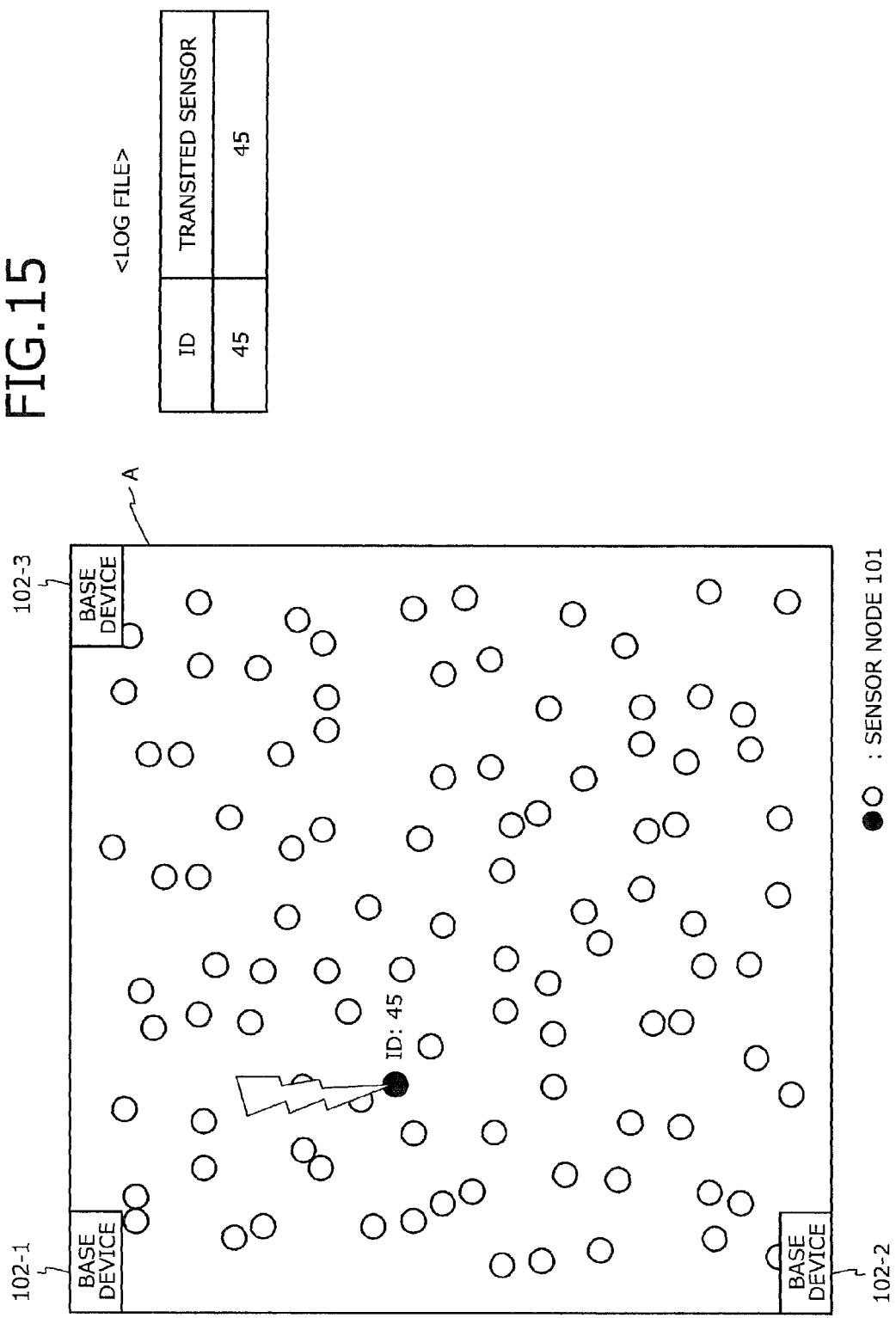
FIG. 15 is a diagram depicting a searching process (part 1)

FIG. 15 is a diagram depicting a searching process (part 1). In FIG. 15, a sensor node 101-45 is selected. A log file is a table that stores a communication path. The log file includes fields of ID and transited sensor.

Figure 16:
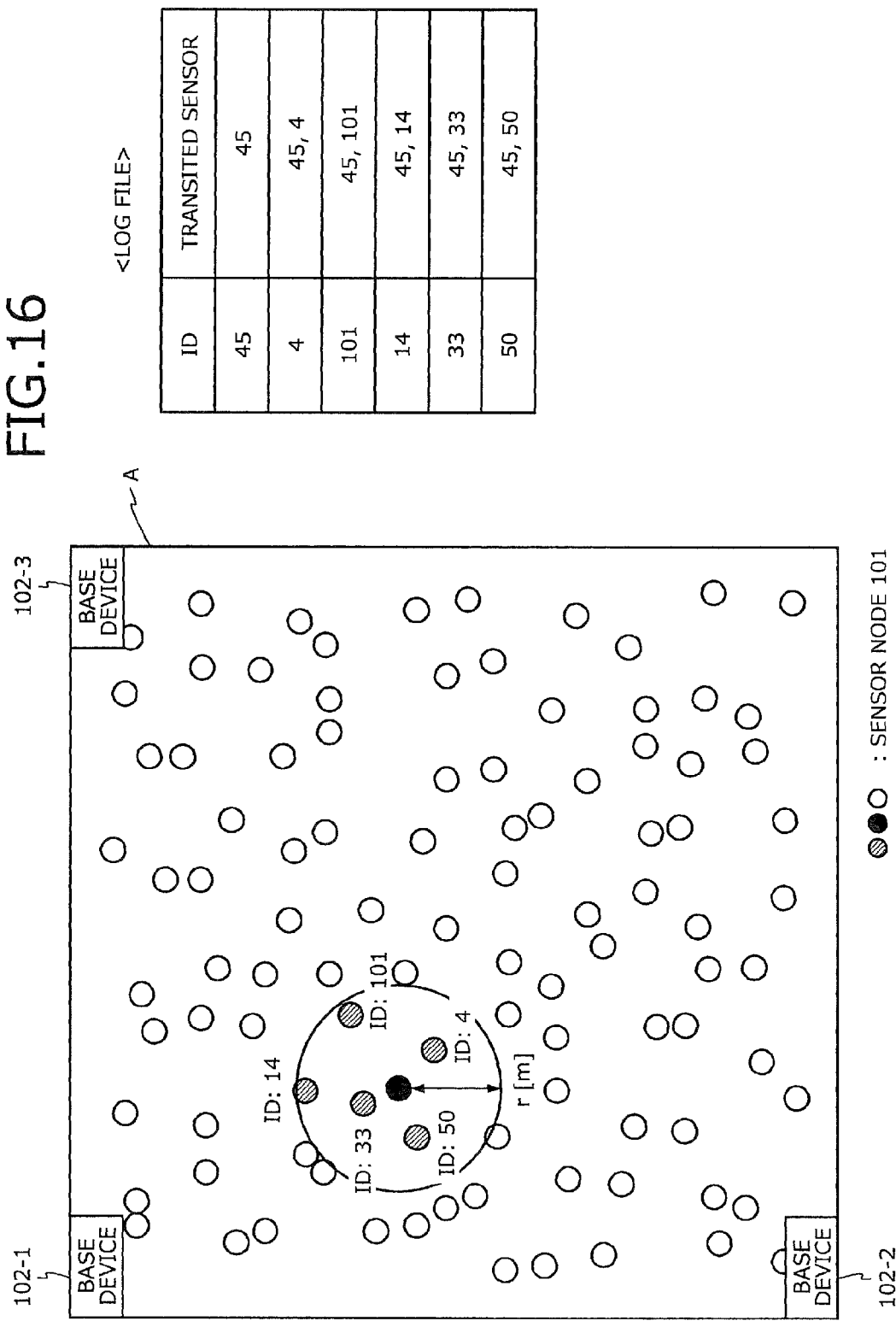
FIG. 16 is a diagram depicting a searching process (part 2)

FIG. 16 is a diagram depicting a searching process (part 2). Sensor nodes present in a communicable range of one hop with the selected sensor node at the center are searched for. In FIG. 16, sensor nodes 101-4, 101, 14, 33, and 50 are retrieved. IDs of 4, 101, 14, and 33, 50 are registered in the ID field of the log file.

Figure 17:
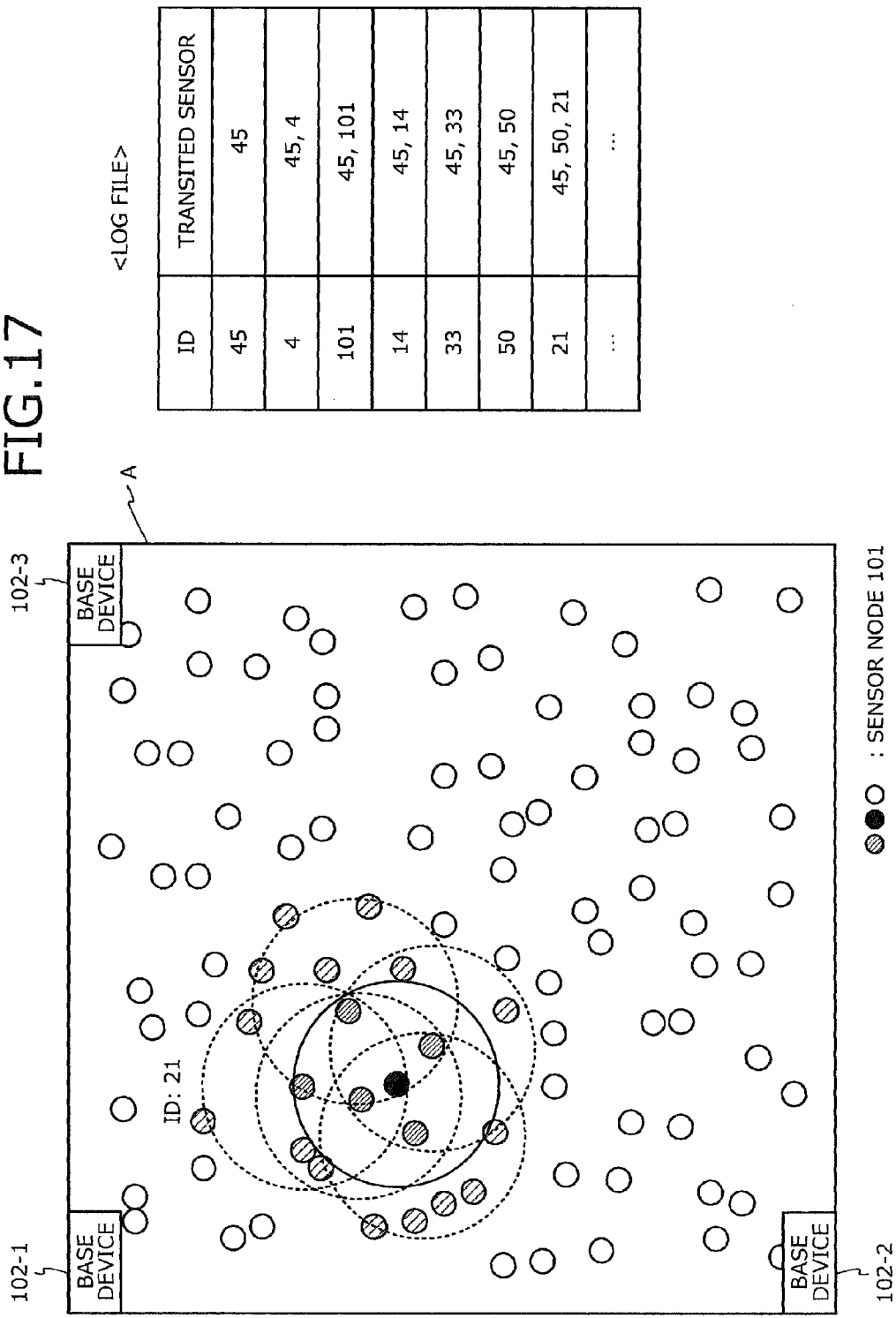
FIG. 17 is a diagram depicting a searching process (part 3)

FIG. 17 is a diagram depicting a searching process (part 3). Sensor nodes present in a communicable range of one hop with each retrieved sensor node at the center are searched for. In this way, a path from the selected sensor node to one of the base devices is searched for. For example, the position of the sensor node 101-21 is within the communicable range by one hop from the position of the sensor node 101-50. ID 21 is registered in the ID field of the log file and IDs 45, 50, and 21 are registered in the transited sensor field.

Figure 18:
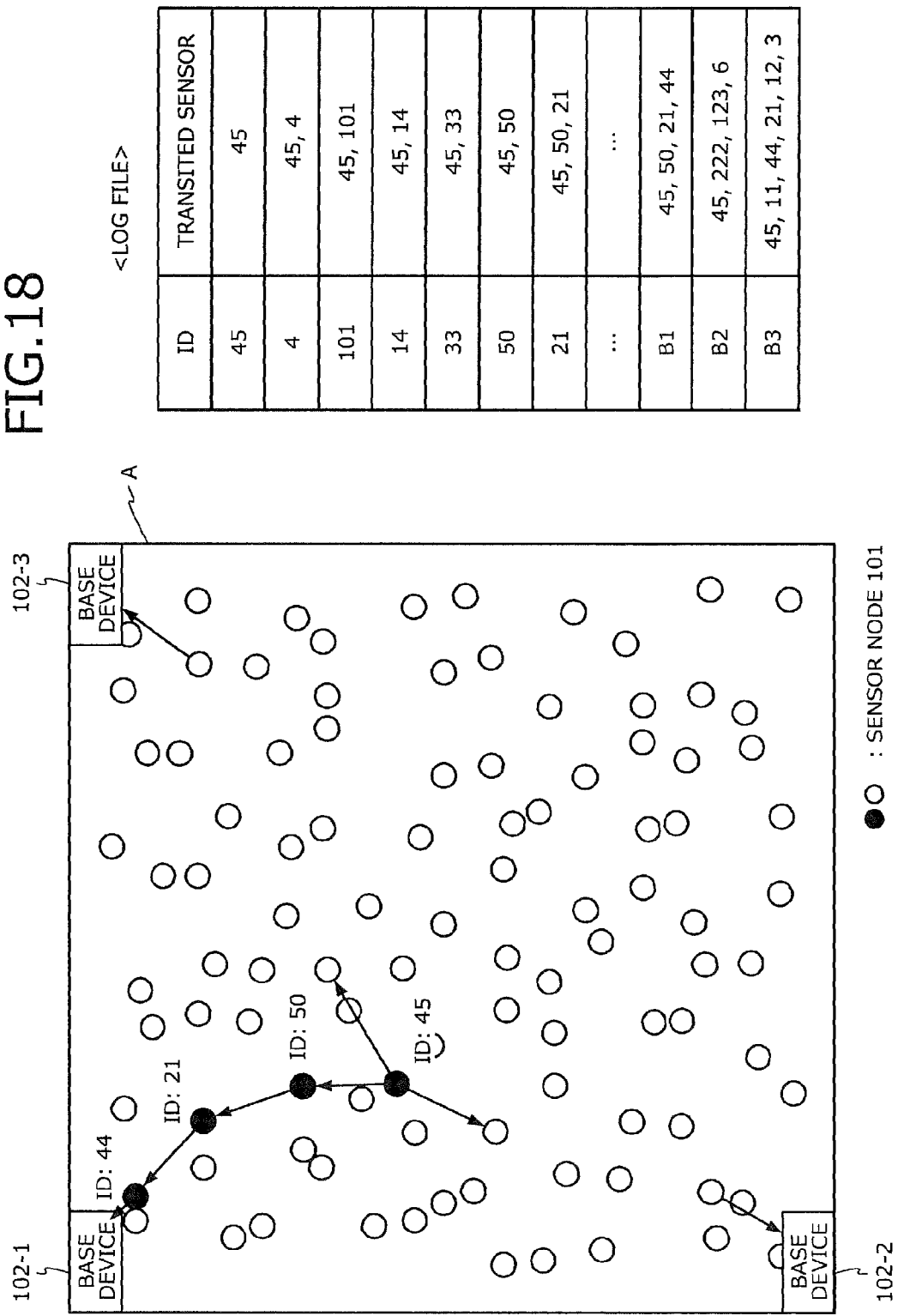
FIG. 18 is a diagram depicting a retrieved communication path.

FIG. 18 is a diagram depicting a retrieved communication path. In FIG. 18, the communication path from the selected sensor node to one of the base devices is depicted.

FIG. 19 is a diagram depicting an example of distance calculation. The detecting unit 1304 measures, for each base device, the distances corresponding to each hop of the retrieved communication path based on the position information of a base device and the position information of the selected sensor node. For example, the distance $l_{11}$ corresponding to the space between the base device 102-1 and the sensor node 101-44, the distance $l_{12}$ corresponding to the space between the sensor node 101-44 and the sensor node 101-21, the distance $l_{13}$ corresponding to the space between the sensor node 101-21 and the sensor node 101-50, and the distance $l_{14}$ corresponding to the space between the sensor node 101-50 and the sensor node 101-45 are measured.

The deriving unit 1305 derives frequencies of distances for each base device. The deriving unit 1305 may derive a probability distribution based on a distribution of distances. The deriving unit 1305 stores the data in the storage device 110 as depicted in FIG. 1.

The deriving unit 1305 derives the frequencies of distances corresponding to each hop for each base device 102. The deriving unit 1305 may derive a probability distribution based on the distribution of distances. The deriving unit 1305 stores, as the distribution of estimated distances corresponding to each hop, the probability distribution derived from the frequency of distances.

The deriving unit 1305 derives a probability distribution of one-hop distances for each base device 102. The deriving unit 1305, assuming that the probability distribution is a normal distribution, calculates the average $\mu_{ij}$ and the variance $\sigma_{ij}^2$ of the normal distribution from Equations (1) and (2) below where k indicates the k-th simulation, i indicates one of the base devices 102, $l_{ijk}$ denotes the distance that data advances at the j-th hop counted from the base device 102, and #$K_{ij}$ denotes the number of elements belonging to $K_{ij}$.

$K_{ij} = \{k | l_{ijk} \text{ exists}\}$,

$K_{ij}$ = number of elements in $K_{ij}$, $$\mu_{ij} = \sum_{k \in K_{ij}} l_{ijk} / \#K_{ij} \qquad (1)$$

$$\sigma_{ij}^2 = \sum_{k \in K_{ij}} (l_{ijk} - \mu_{ij})^2 / \#K_{ij} \qquad (2)$$

The deriving unit 1305 acquires a distribution of $l_{ij}$ by substituting the average and the variance into Equation (3) below.

$$g(l_{ij}) = \frac{1}{\sqrt{2\pi\sigma_{ij}^2}} \exp\left\{-\frac{(l_{ij} - \mu_{ij})^2}{2\sigma_{ij}^2}\right\} \qquad (3)$$

Figure 20:
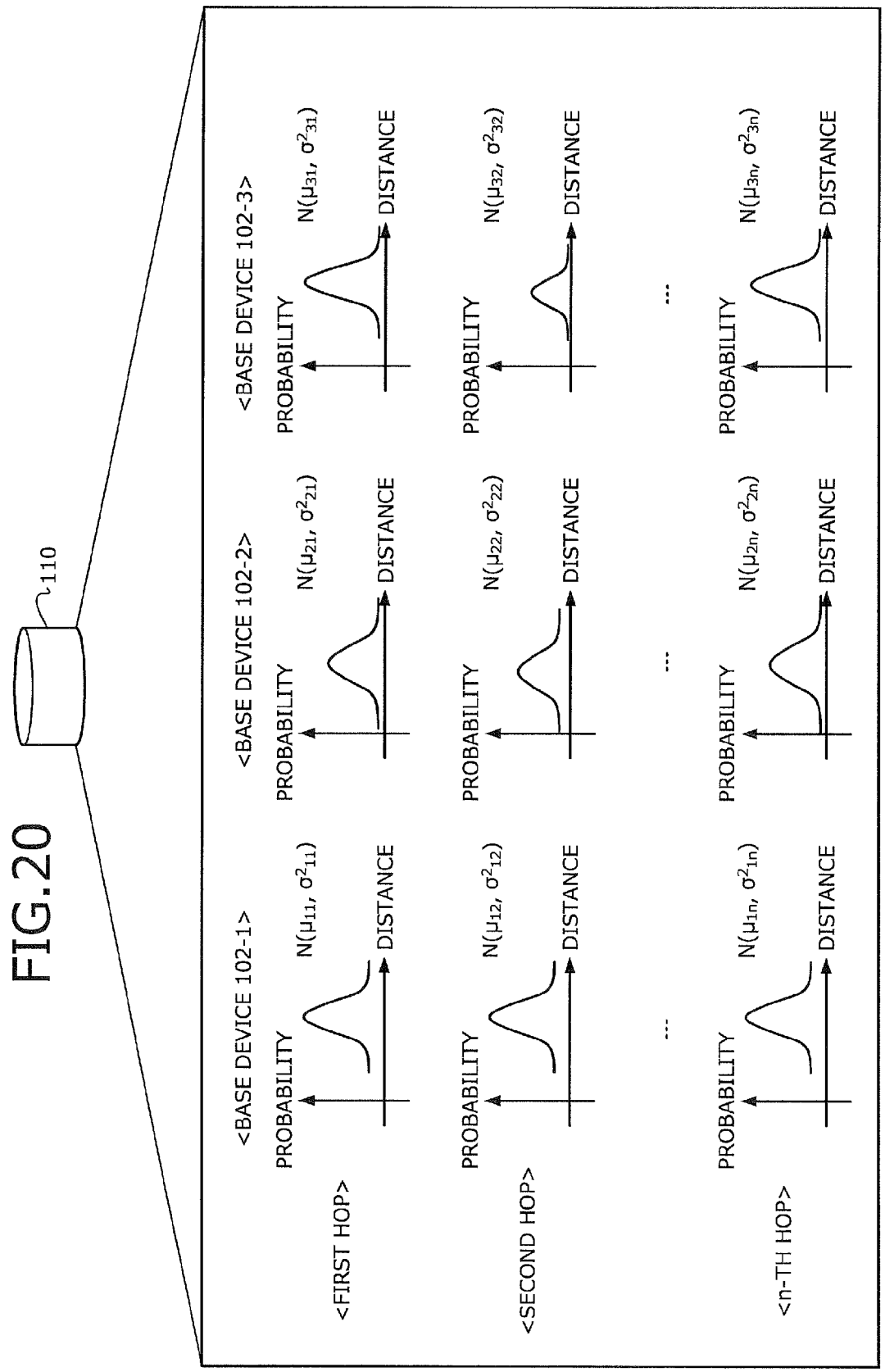
FIG. 20 is a diagram depicting probability distributions of estimated distances stored in a storage device.

FIG. 20 is a diagram depicting probability distributions of estimated distances stored in the storage device. The storage device 110 stores a probability distribution depicting a probability based on the frequencies of each hop for each base device 102.

Figure 21:
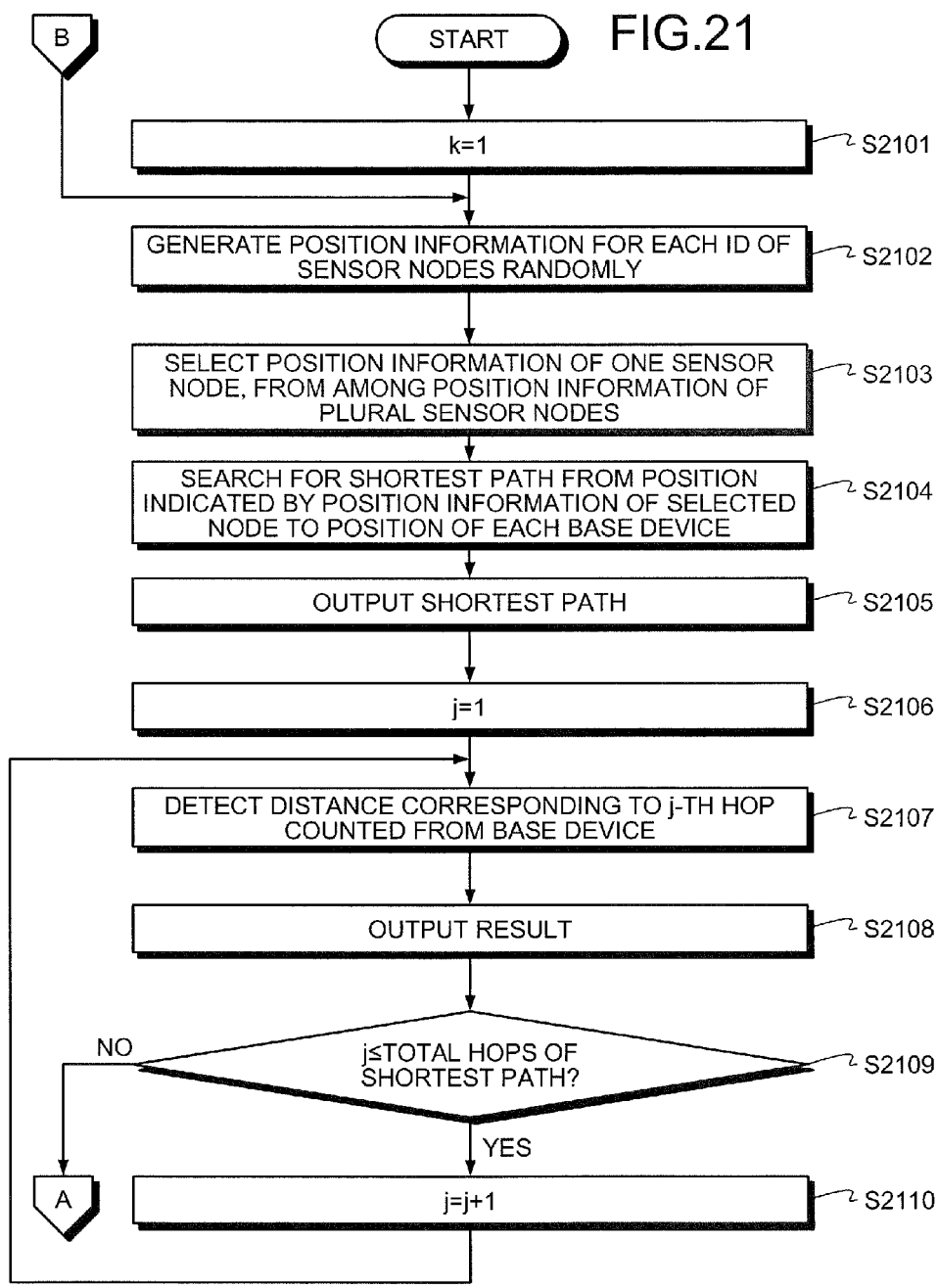
FIG. 21 and FIG. 22 are flowcharts depicting an example of process of generating a distribution performed by the position estimation apparatus.
Figure 22:
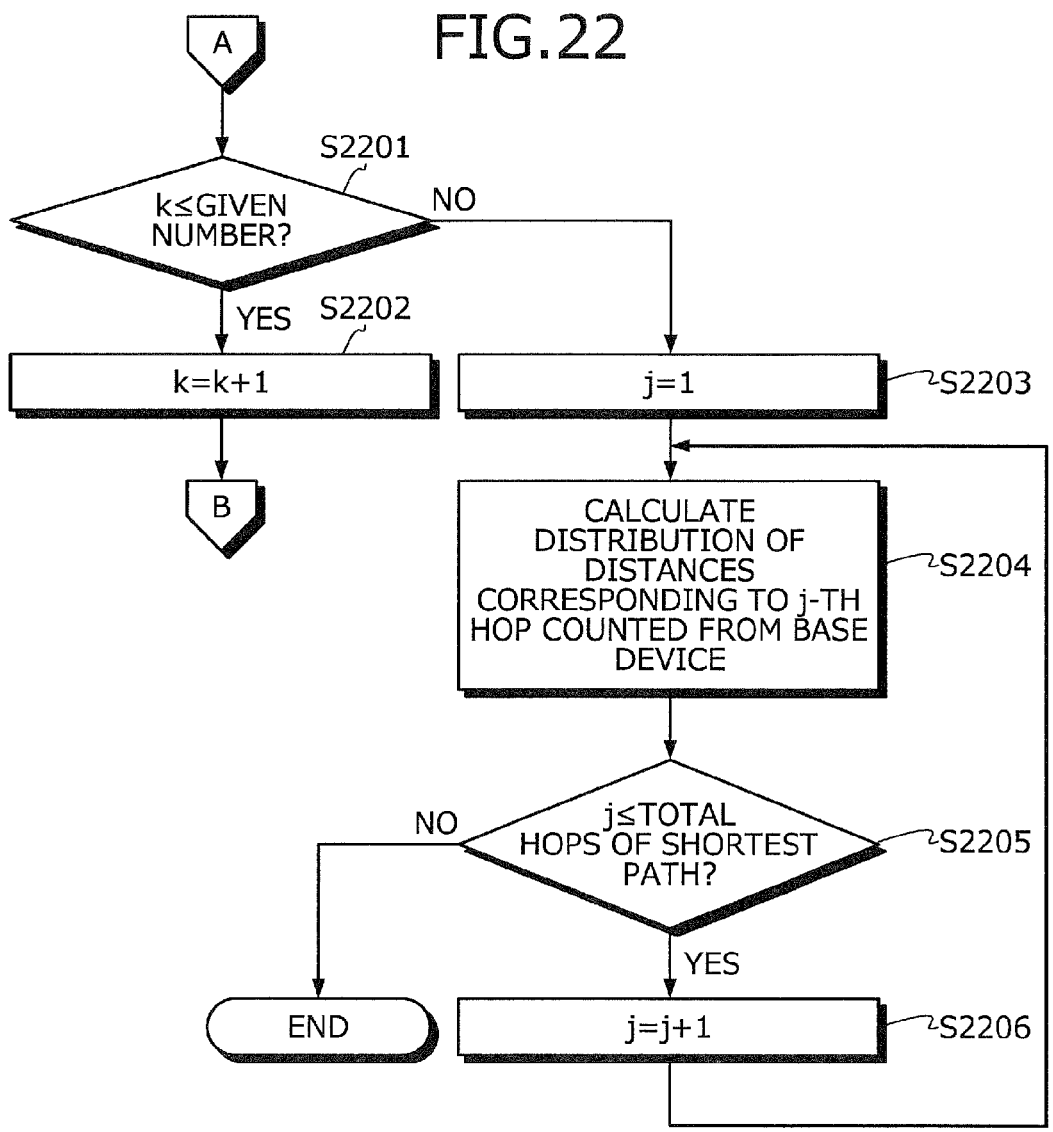

FIG. 21 and FIG. 22 are flowcharts depicting an example of a process of generating a distribution performed by the position estimation apparatus. The position estimation apparatus 100 sets k as k=1 (step S2101) and randomly generates position information for each ID of the sensor nodes 101 (step S2102). The position estimation apparatus 100 selects from among position information of plural sensor nodes, position information of one sensor node 101 (step S2103). The position estimation apparatus 100 may randomly select one sensor node or select one sensor node from within a given area.

The position estimation apparatus 100 searches for the shortest path from the selected sensor node 101 to a base device 102, for each base device based on the communicable distance by one hop (step S2104). The position estimation apparatus 100 outputs the shortest path (step S2105).

The position estimation apparatus 100 sets j as j=1 (step S2106) and detects a distance corresponding to the j-th hop counted from a base device, for every base device (step S2107). The position estimation apparatus 100 outputs a result (step S2108) and determines whether j≤the number of hops of the shortest path (step S2109). If j≤the number of hops of the shortest path (step S2109: YES), the position estimation apparatus 100 sets j as j=j+1 (step S2110), and the process returns to step S2107.

If "j≤the number of hops of the shortest path" is not true (step S2109: NO), the position estimation apparatus 100 determines whether k≤a given number (step S2201). If k≤a given number (step S2201: YES), the position estimation apparatus 100 sets k as k=k+1 (step S2202) and the process returns to step S2102. If "k≤a given number" is not true (step S2201: NO), the position estimation apparatus 100 sets j as j=1 (step S2203) and calculates a distribution of distances corresponding to the j-th hop counted from the base device (step S2204). For example, a probability distribution is derived from the frequencies of distances.

The position estimation apparatus 100 determines whether j≤the number of hops of the shortest path (step S2205). If "j≤the number of hops of the shortest path" is true (step S2205: YES), the position estimation apparatus 100 sets j as j=j+1 (step S2206) and the process returns to step S2204. If j≤the number of hops of the shortest path is not true (step S2205: NO), the process ends.

The elements of the generating unit 1301 to the deriving unit 1305 may be performed by a computer other than the position estimation apparatus 100. When the computer other than the position estimation apparatus 100 conducts the functions of the elements above, the computer stores the generated distributions in a storage device that is accessible by the position estimation apparatus 100.

A process where the position estimation apparatus 100 estimates the position of a sensor node during the operation of the sensor network system 200 is explained.

FIG. 23 is a diagram depicting a hops accumulating table. The position estimation apparatus 100, communicating with each base device 102, acquires information concerning how many hops are needed to reach a base device 102 from a sensor node and creates the hops accumulating table 2300.

The hops accumulating table 2300 includes fields of sensor ID, the least hops to the base device 1, the least hops to the base device 2, and the least hops to the base device 3. The fields with information registered therein are stored as records (for example 2301-1, 2301-2). The hops accumulating table 2300 is implemented by a storage device such as the RAM 1203, the magnetic disk 1205, and the optical disk 1207. Identification information of each sensor node is registered in the field of sensor ID.

The least number of hops that data of the sensor node indicated by the sensor ID in the field needs to reach the base device 102-1 is registered in the field of the least hops to the base device 1. The least number of hops that data of the sensor node indicated by the sensor ID in the field needs to reach the base device 102-2 is registered in the field of the least hops to the base device 2. The least number of hops that data of the sensor node indicated by the sensor ID in the field needs to reach the base device 102-3 is registered in the field of the least hops to the base device 3.

FIG. 24 is a diagram depicting a one-hop range sensor table. The position estimation apparatus 100, communicating with base devices, acquires information concerning which sensor node the sensor node under consideration can communicate with by one hop and creates a one-hop range sensor table 2400. The one-hop range sensor table 2400 includes, for example, fields of sensor ID and one-hop range sensor ID.

The fields with information registered therein are stored as records (for example, 2401-1). The one-hop range sensor table 2400 may be implemented by a storage device such as the RAM 1203, the magnetic disk 1205, and the optical disk 1207. Identification information of each sensor node is registered in the field of sensor ID. Identification information of sensor nodes that the sensor node indicated by the identification information in the sensor ID field can communicate with by one hop is registered in the field of the one-hop range sensor ID.

The acquiring unit 1311 acquires, based on the communication between the sensor node under consideration and a base device, the number of hops that data from the sensor node under consideration requires to reach a base device. For example, the acquiring unit 1311 acquires the least number of hops to each base device from the hops accumulating table 2300, based on the ID of the sensor node under consideration.

The first calculating unit 1312 calculates a distribution of estimated distances under the least hops between sensor nodes and the base devices based on the least hops and the distributions of estimated distances stored in the storage device 110. The first calculating unit 1312 also calculates a distribution of estimated distances under the least hops between sensor nodes and the base devices based on the sum of distributions of estimated one-hop distances with the total hops ≤ the least hops.

Figure 25:
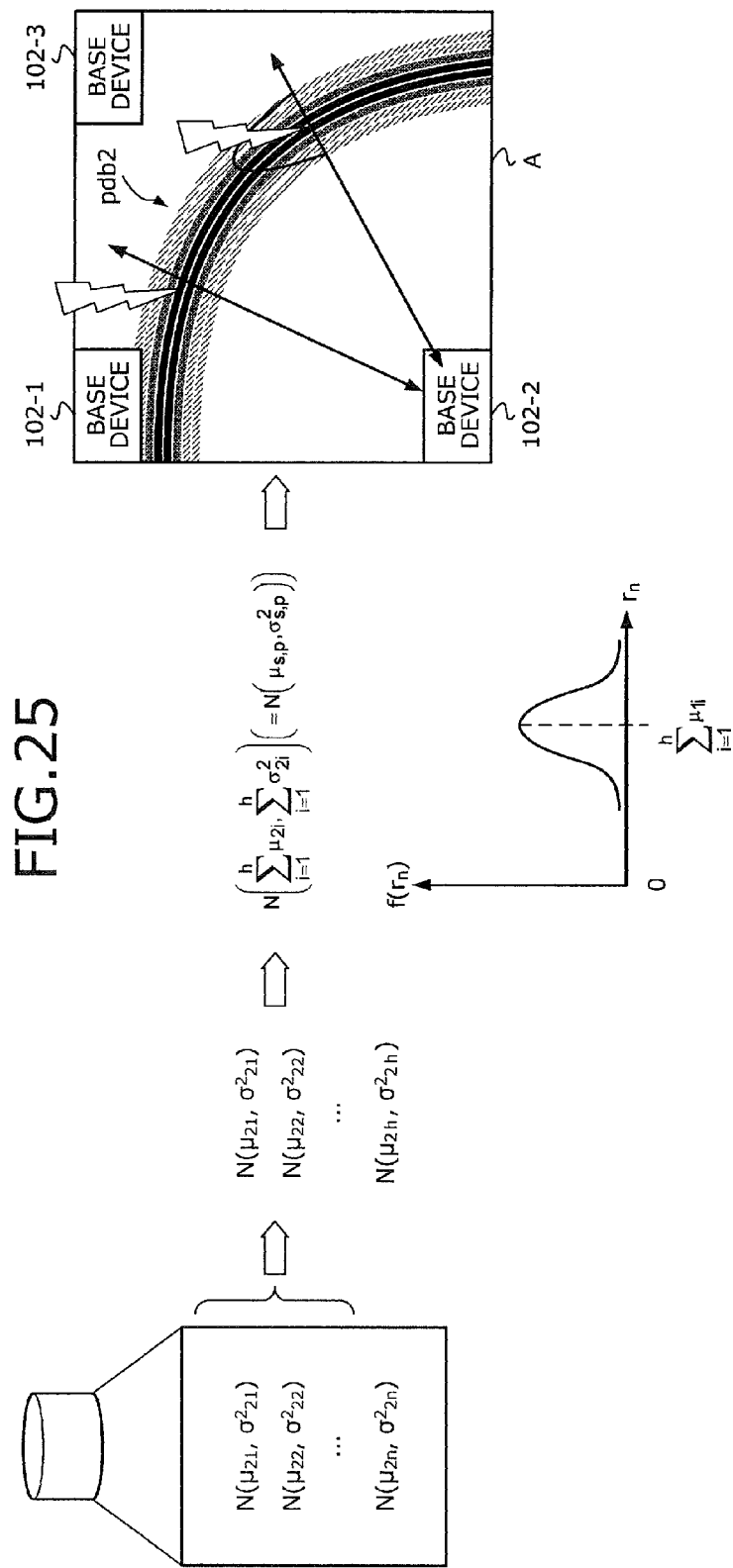
FIG. 25 is a diagram depicting a distribution of estimated positions under the least hops.

FIG. 25 is a diagram depicting a distribution of estimated position under the least hops. The least hops are denoted by h. The sensor node under consideration is labeled with s. The first calculating unit 1312 acquires $N(\mu_{21}, \sigma^2_{21})$ to $N(\mu_{2h}, \sigma^2_{2h})$ from the storage device 110. The first calculating unit 1312 yields the sum of $N(\mu_{21}, \sigma^2_{21})$ to $N(\mu_{2h}, \sigma^2_{2h})$. A distribution obtained by the summation is a distribution of estimated distances $r_h$ under the least hops.

The second calculating unit 1313 calculates, for each base device, a distribution of estimated positions within the region A, based on the distribution of estimated distances, the information concerning the range of the region A, and the information concerning the position of the base device. In FIG. 25, dark color indicates a higher probability of the presence of a sensor node and fainter color indicates a lower probability.

For example, the second calculating unit 1313 calculates a distribution of estimated positions of the sensor node under consideration with a polar coordinate system $(r, \theta)$ based on the distances from the base device 102-$p$. $p$ represents identification information of each base device. A conditional probability distribution $f_{s,p}(r|\theta)$, a probability distribution of $r$ with $\theta$ fixed, is represented by Equations (4) to (6) below.

$$f_{s,p}(r|\theta) = \begin{cases} \dfrac{\dfrac{1}{\sqrt{2\pi\sigma^2_{s,p}}}\exp\left\{-\dfrac{(r-\mu_{s,p})^2}{2\sigma_{s,p}}\right\}}{\displaystyle\int_0^{100/\cos\theta} \dfrac{1}{\sqrt{2\pi\sigma^2_{s,p}}}\exp\left\{-\dfrac{(t-\mu_{s,p})^2}{2\sigma_{s,p}}\right\}dt} & \left(0 \le \theta < \dfrac{\pi}{4}, 0 \le r \le \dfrac{100}{\cos\theta}\right) \quad (4) \\[2ex] \dfrac{\dfrac{1}{\sqrt{2\pi\sigma^2_{s,p}}}\exp\left\{-\dfrac{(r-\mu_{s,p})^2}{2\sigma_{s,p}}\right\}}{\displaystyle\int_0^{100/\sin\theta} \dfrac{1}{\sqrt{2\pi\sigma^2_{s,p}}}\exp\left\{-\dfrac{(t-\mu_{s,p})^2}{2\sigma_{s,p}}\right\}dt} & \left(\dfrac{\pi}{4} \le \theta < \dfrac{\pi}{2}, 0 \le r \le \dfrac{100}{\sin\theta}\right) \quad (5) \\[2ex] 0 & (\text{else}) \quad (6) \end{cases}$$

Figure 26:
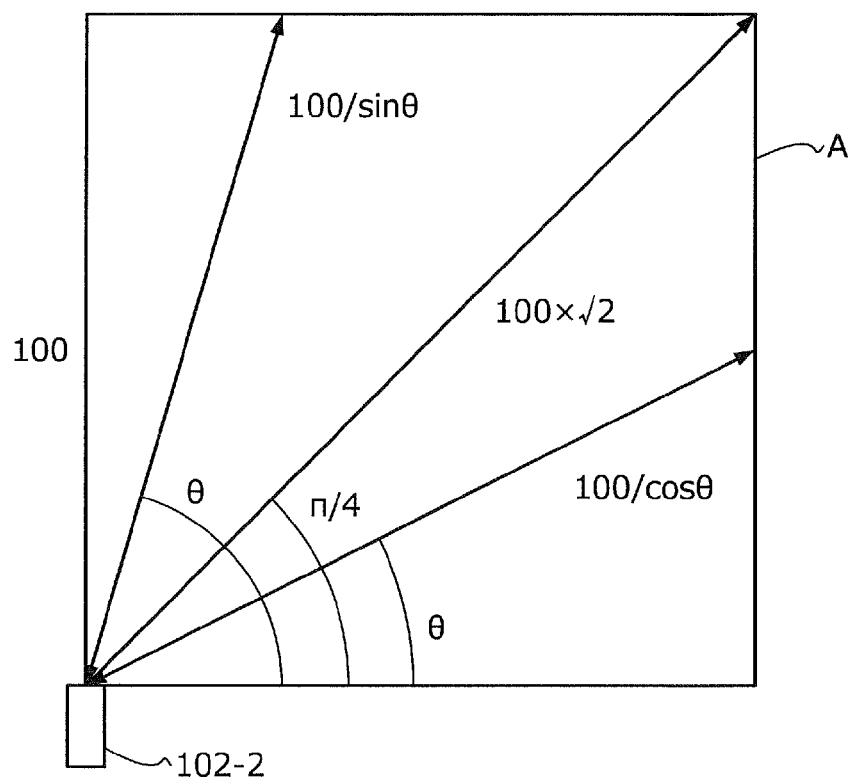
FIG. 26 is a diagram depicting a range of r and θ.
Figure 27:
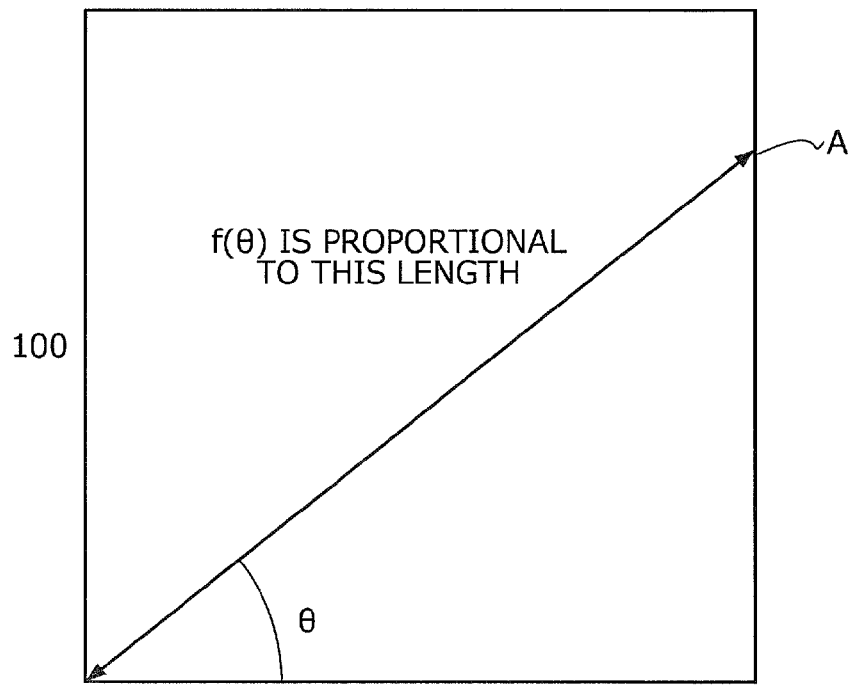
FIG. 27 is a diagram depicting f(θ)

FIG. 26 is a diagram depicting a range of $r$ and $\theta$. FIG. 27 is a diagram depicting $f(\theta)$. The range of $r$ and $\theta$ is determined as depicted in the figure. $f(\theta)$ is proportional to the length depicted in the figure. Therefore, $f_{s,p}(\theta)$ is represented by Equations (7) to (9) below.

$$f_{s,p}(\theta) = \begin{cases} \dfrac{100}{k_0 \cos\theta} & \left(0 \le \theta \le \dfrac{\pi}{4}\right) \quad (7) \\[1ex] \dfrac{100}{k_0 \sin\theta} & \left(\dfrac{\pi}{4} \le \theta \le \dfrac{\pi}{2}\right) \quad (8) \\[1ex] 0 & (\text{else}) \quad (9) \end{cases}$$

$k_0$ is written as Equation (10) below.

$$\begin{aligned} k_0 &= \int_0^{\pi/4} \dfrac{100}{\cos\theta} d\theta + \int_{\pi/4}^{\pi/2} \dfrac{100}{\sin\theta} d\theta \\ &= 50\log\left(\dfrac{\sqrt{2}+1}{\sqrt{2}-1}\right) - 50\log\left(\dfrac{\sqrt{2}-1}{\sqrt{2}+1}\right) \\ &= 100\log\left(\dfrac{\sqrt{2}+1}{\sqrt{2}-1}\right) \end{aligned} \quad (10)$$

$f_{s,p}(r, \theta)$ is derived according to Equation (11) below and thus is represented by Equations (12) to (14) below.

$$f_{s,p}(r, \theta) = f_{s,p}(r|\theta) \times f_{s,p}(\theta) \quad (11)$$

$$f_{s,p}(r,\theta) = \begin{cases} \dfrac{\dfrac{100}{k_0\cos\theta\sqrt{2\pi\sigma_{s,p}^2}}\exp\left\{-\dfrac{(r-\mu_{s,p})^2}{2\sigma_{s,p}}\right\}}{\displaystyle\int_0^{100/\cos\theta} \dfrac{1}{\sqrt{2\pi\sigma_{s,p}^2}}\exp\left\{-\dfrac{(t-\mu_{s,p})^2}{2\sigma_{s,p}}\right\}dt} & \left(0 \le \theta < \dfrac{\pi}{4}, 0 \le r \le \dfrac{100}{\cos\theta}\right) \quad (12) \\[1em] \dfrac{\dfrac{100}{k_0\sin\theta\sqrt{2\pi\sigma_{s,p}^2}}\exp\left\{-\dfrac{(r-\mu_{s,p})^2}{2\sigma_{s,p}}\right\}}{\displaystyle\int_0^{100/\sin\theta} \dfrac{1}{\sqrt{2\pi\sigma_{s,p}^2}}\exp\left\{-\dfrac{(t-\mu_{s,p})^2}{2\sigma_{s,p}}\right\}dt} & \left(\dfrac{\pi}{4} \le \theta < \dfrac{\pi}{4}, 0 \le r \le \dfrac{100}{\sin\theta}\right) \quad (13) \\[1em] 0 & \text{(else)} \quad (14) \end{cases}$$

The second calculating unit 1313 transforms the distribution of estimated position of a sensor node 101-$s$ $f_{s,p}(r, \theta)$ under the polar coordinate system $(r, \theta)$ to a distribution $f_{s,p}(x,y)$ under an orthogonal coordinate system. Since the transformation from the polar coordinates to the orthogonal coordinates is given by $x = r\cos\theta$ and $y = r\sin\theta$ which is also written as Equations (15) and (16) below.

$$r = \sqrt{x^2 + y^2} \quad (15)$$

$$\theta = \arctan\frac{y}{x} \quad (16)$$

The probability density function of Equation (12) can be expressed as Equation (17) below under the orthogonal coordinate system. The probability density function of Equations (13) and (14) is expressed as Equations (18) and (19) below under the orthogonal coordinate system. In this way, the second calculating unit 1313 calculates the sum of distributions of estimated positions based on Equations (17) to (19).

$$f_{s,p}(x, y) = \begin{cases} \dfrac{\dfrac{100}{k_0 x\sqrt{2\pi\sigma_{s,p}^2}}\exp\left\{-\dfrac{\left(\sqrt{x^2+y^2}-\mu_{s,p}\right)^2}{2\sigma_{s,p}}\right\}}{\displaystyle\int_0^{100\frac{\sqrt{x^2+y^2}}{x}} \dfrac{1}{\sqrt{2\pi\sigma_{s,p}^2}}\exp\left\{-\dfrac{(t-\mu_{s,p})^2}{2\sigma_{s,p}}\right\}dt} & \left(0 \le \dfrac{y}{x} \le 1, 0 < x < 100, 0 < y < 100\right) \quad (17) \\[1em] \dfrac{\dfrac{100}{k_0 y\sqrt{2\pi\sigma_{s,p}^2}}\exp\left\{-\dfrac{\left(\sqrt{x^2+y^2}-\mu_{s,p}\right)^2}{2\sigma_{s,p}}\right\}}{\displaystyle\int_0^{100\frac{\sqrt{x^2+y^2}}{y}} \dfrac{1}{\sqrt{2\pi\sigma_{s,p}^2}}\exp\left\{-\dfrac{(t-\mu_{s,p})^2}{2\sigma_{s,p}}\right\}dt} & \left(1 < \dfrac{y}{x}, 0 < x < 100, 0 < y < 100\right) \quad (18) \\[1em] 0 & \text{(else)} \quad (19) \end{cases}$$

The third calculating unit 1314 calculates, for each base device, an index that indicates a probability of the position of the sensor node under consideration, based on the sum of distributions of estimated positions yielded by the second calculating unit 1313. For example, the third calculating unit 1314 calculates the index based on Equation (20) below. P denotes the number of base devices. The third calculating unit 1314 divides the sum of three distributions by three because P=3 in this example.

$$f_s(x, y) = \frac{1}{P}\sum_{p=1}^{P} f_{s,p}(x, y) \quad (20)$$

The deriving unit 1315 derives an estimated position of the sensor node under consideration based on the index calculated by the third calculating unit 1314. Two examples of the derivation of an estimated position are introduced below.

Figure 28:
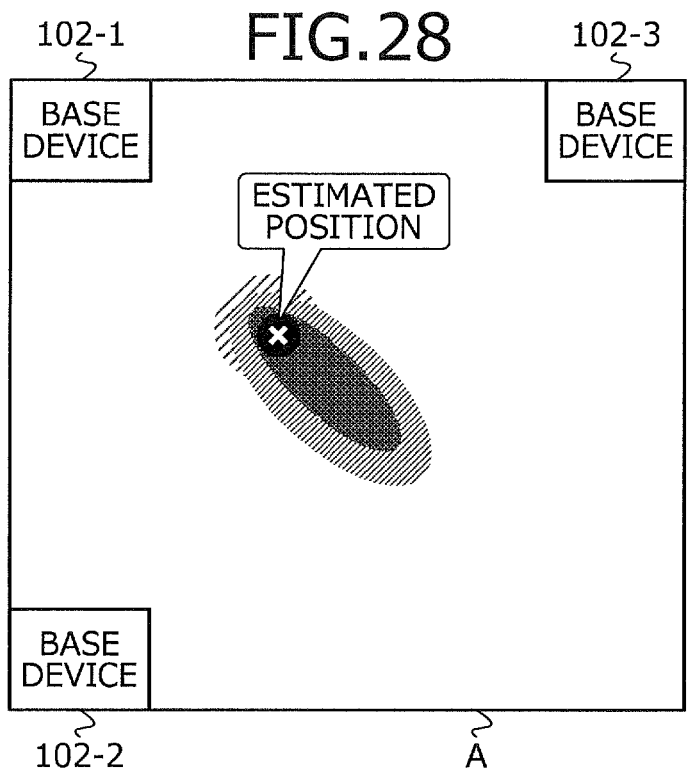
FIG. 28 is a diagram depicting a first example of the derivation of an estimated position.

FIG. 28 is a diagram depicting a first example of the derivation of an estimated position. A distribution in FIG. 28 illustrates an index that indicates where a sensor node is likely to be present within the region A. Darker color indicates a higher probability of the presence of the sensor node under consideration. Fainter color indicates a lower probability of the presence of the sensor node under consideration.

For example, the deriving unit 1315 derives an estimated position where the index takes the maximum.

Figure 29:
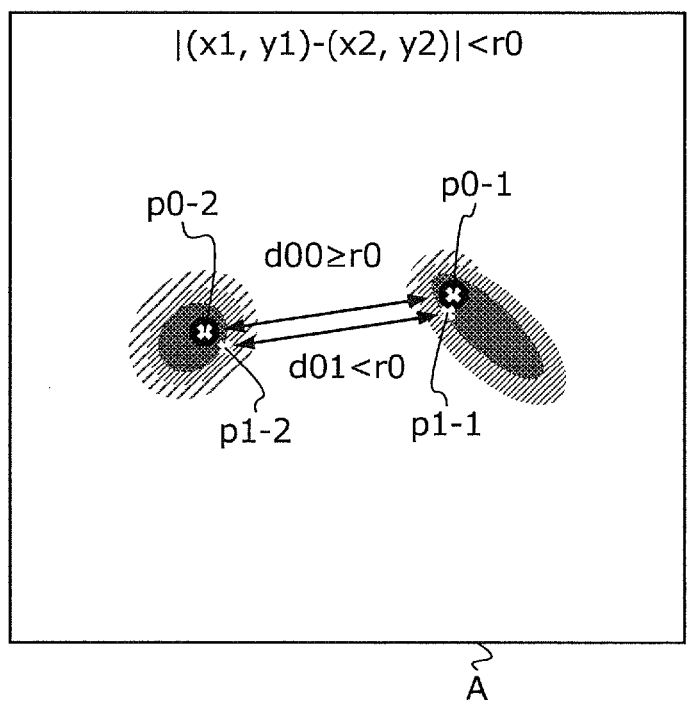
FIG. 29 is a diagram depicting a second example of the derivation of an estimated position.

FIG. 29 is a diagram depicting a second example of the derivation of an estimated position. In FIG. 29, it is assumed that indexes for two sensor nodes have been calculated. It is also assumed that the two sensor nodes can communicate with each other by one hop. The deriving unit 1315 specifies, based on the one-hop range sensor table 2400, two sensor nodes that can communicate with each other by one hop.

The deriving unit 1315 derives estimated positions of two sensor nodes that can communicate with each other by one hop. The deriving unit 1315 derives, based on the two indexes, estimated positions of two sensor nodes have a distance therebetween that is less than a threshold.

In FIG. 29, the estimated position of a first sensor node is expressed as $(x_1, y_1)$ and the estimated position of a second sensor node is expressed as $(x_2, Y_2)$. The deriving unit 1315 determines whether the distance between the two sensor nodes is less than the threshold $r_0$. The threshold may be the smallest distance among distances where data cannot surely be received between sensor nodes. The threshold is stored beforehand by a designer or developer of the sensor network system 200 in a storage device such as the RAM 1203, the magnetic disk 1205, and the optical disk 1207.

For example, the estimated positions $p_{0-1}$ and $p_{0-2}$ have high probabilities while the distance $d_{00}$ between the positions $p_{0-1}$ and $p_{0-2}$ is at least the threshold $r_0$. In this case, the positions $p_{0-1}$ and $p_{0-2}$ are not regarded as the estimated positions.

On the other hand, the distance $d_{01}$ between the estimated positions $p_{1-1}$ and $p_{1-2}$ is less than the threshold $r_0$. In this case, the positions $p_{1-1}$ and $p_{1-2}$ are regarded as the estimated positions of the sensor nodes.

The deriving unit 1315 derives estimated positions of the two sensor nodes where the maximal probabilities are obtained with the distance therebetween being less than the threshold.

The deriving unit 1315 derives estimated positions of some sensor nodes simultaneously. The term of some sensor nodes indicates sensor nodes whose indexes have been calculated by the third calculating unit 1314. The deriving unit 1315 derives estimated positions of the sensor nodes based the indexes.

For example, the deriving unit 1315 solves (a) of Equation (21) below so that (b) of Equation (21) is satisfied. $\Lambda$ is a set of pairs of sensor IDs that are obtained from the one-hop range sensor table 2400 and indicate a pair of sensor nodes within a communication range covered by one hop.

$$\underset{(a)}{\mathrm{argmax}\left\{\prod_{s=1}^{n} f_s(x_s, y_s)\right\}} \quad (21)$$

$$\text{s.t.} \quad \underset{(b)}{\|(x_{s_i}, y_{s_i}) - (x_{s_j}, y_{s_j})\| < r_0, \ (i, j) \in \Lambda}$$

To solve Equation (21), the method of Lagrange multipliers may be used. The deriving unit 1315 solves the system of Equations (22), (23), (24), and (25) below.

$$g(x, y, \lambda) = \prod_{s=1}^{n} f_s(x_s, y_s) + \sum_{(i,j) \in \Lambda} \lambda_{i,j} \{\|(x_{s_i}, y_{s_i}) - (x_{s_j}, y_{s_j})\| - r_0\} \quad (22)$$

$$\frac{\partial}{\partial x_s} g(x, y, \lambda) = 0 \quad s = 1, 2, \ldots, n \quad (23)$$

$$\frac{\partial}{\partial y_s} g(x, y, \lambda) = 0 \quad s = 1, 2, \ldots, n \quad (24)$$

$$\frac{\partial}{\partial \lambda_{i,j}} g(x, y, \lambda) = 0 \quad (i, j) \in \Lambda \quad (25)$$

When the region A is expressed with $\{(x, y) | 0 \le x \le 100, 0 \le y \le 100\}$, $x_s$ and $y_s$ can take arbitrary values in this region and thus the number of combinations of all estimated positions is infinite. Therefore, when the system of Equations (23), (24), and (25) cannot be solved, the deriving unit 1315 may give to $x_s$ and $y_s$ discrete values such as 1, . . . , 100 and solve Equation (21). In this way, the number of combinations of all estimated positions becomes finite and a solution of Equation (21) can be obtained even if estimated positions are less accurate.

FIG. 30 is a flowchart depicting the first example of the position estimation process performed by the position estimation apparatus. In FIG. 30, the first example of the position estimation process is explained. The position estimation apparatus 100 selects an ID of a target sensor node from the hops accumulating table 2300 (step S3001). The position estimation apparatus 100 sets p as p=1 (step S3002) and determines whether p≤the number of base devices (step S3003).

If p≤the number of base devices (step S3003: YES), the position estimation apparatus 100 acquires the number of hops between the target sensor node and a base device 102-$p$ based on the ID (step S3004). The position estimation apparatus 100 acquires from the storage device 110, distributions of estimated distances corresponding to a hop (step S3005) and calculates a distribution of estimated distances amounting to the hops (step S3006). The position estimation apparatus 100 calculates a distribution of estimated positions within the region A, based on the distribution of estimated distances, the information concerning the range of the region A, and the information concerning the position of the base device 102-$p$ (step S3007) and sets p as p=p+1 (step S3008). The process returns to step S3003.

If "p≤the number of base devices" is not true (step S3003: NO), the position estimation apparatus 100 calculates a distribution of estimated positions of the target sensor node based on the sum of the distributions of estimated positions calculated for the base devices (step S3009). The position estimation apparatus 100 derives an estimated position of the target node where the probability becomes maximal, based on the distribution of estimated positions of the target sensor node (step S3010). The position estimation apparatus 100 associates and outputs the estimated position and the ID of the target sensor node (step S3011) and the process ends.

FIG. 31 and FIG. 32 are flowcharts depicting the second example of the position estimation process performed by the position estimation apparatus. In FIG. 31 and FIG. 32, the second example of the position estimation process is explained. The position estimation apparatus 100 determines, based on the hops accumulating table 2300, whether there is an ID of a sensor node that has not yet been selected (step S3101). If there is an ID of a sensor node yet to be selected (step S3101: YES), the position estimation apparatus 100 selects an ID of a sensor node yet to be selected (step S3102). It is assumed that the selected ID indicates a target sensor node. The position estimation apparatus 100 checks whether the least hops of the target node have been registered in the hops accumulating table 2300 (step S3103). It is checked whether the least hops to all base devices have been registered.

If the least hops of the target sensor node has not yet been registered (step S3103: NO), the process returns to step S3101. If the least hops of the target sensor node has been registered (step S3103: YES), the position estimation apparatus 100 sets p as p=1 (step S3104) and determines whether p≤the number of base devices (step S3105). p is a variable for specifying an ID of a base device. If p≤the number of base devices (step S3105: YES), the position estimation apparatus 100 acquires, from the hops accumulating table 2300, the number of hops from the target sensor node to the base device 102-$p$ (step S3106).

The position estimation apparatus 100 acquires, from the storage device 110, a distribution of estimated distances corresponding to the acquired total hops (step S3107) and calculates based on the acquired distributions, a distribution of estimated distances amounting to the total hops acquired by the communication with the base device (step S3108). The position estimation apparatus 100 yields a distribution of estimated positions within the region A (step S3109) and sets p as p=p+1 (step S3110), and the process returns to step S3105.

If "p≤the number of base devices" is not true (step S3105: NO), the position estimation apparatus 100 calculates a distribution of estimated positions of the target sensor node based on the sum of the distributions for the base devices 102 (step S3111) and the process returns to step S3101.

If all IDs of sensor nodes have been selected (step S3101: NO), the position estimation apparatus 100 acquires, from the one-hop range sensor table 2400, a pair of sensor nodes that are in a communicable range covered by one hop (step S3201). The position estimation apparatus 100 derives, from the distributions of estimated distances, estimated positions such that the distance between the pair is less than the threshold (step S3202). The position estimation apparatus 100 determines whether positions have been estimated (step S3203). If the positions have been estimated (step S3203: YES), the process goes to S3206. If the positions could not be estimated (step S3203: NO), the position estimation apparatus 100 replaces the information concerning the range of the region A with discrete values (step S3204). As a result, the number of pairs of estimated positions becomes finite.

The position estimation apparatus 100 derives, based on the discrete values, estimated positions such that the distance between the pair is less than the threshold (step S3205). The position estimation apparatus 100 derives estimated positions where the probability takes the maximum value (step S3206) and the process ends. The position estimation apparatus 100 stores the result in a storage device such as the RAM 1203, the magnetic disk 1204, and the optical disk 1206 or outputs the result via the output device 1210.

As explained above, according to the position estimation method, system, and apparatus, distributions of estimated distances corresponding to a hop along a path between a sensor node and a base device is stored beforehand in a storage device. The position estimation apparatus derives a distribution of estimated positions of a target sensor node from the distribution of estimated distances and the number of hops between a base device and the target sensor node in actual communication. As a result, the accuracy of estimating the position of the target sensor node improves. The position estimation apparatus can estimate the position of the target sensor node even if a sensor node does not detect the strength or delay of radio waves. Therefore, load against a sensor node is reduced.

Sensor nodes may be not uniformly disposed in a region because of, for example the shape of the region. Thus, distances corresponding to each hop along the path between a sensor node and a base device are not equal. Distributions of estimated distances corresponding to each hop along the path are stored in the storage device. The position estimation apparatus calculates, for each base device, a distribution of estimated distances corresponding to the total hops based on the sum of the distribution of estimated distances corresponding to each hop. In this way, the accuracy of estimating the position of the target sensor node improves.

The position estimation apparatus specifies a position where the target sensor node is most likely to be present based on the distribution of estimated positions. As a result, the position of the target sensor node having the highest probability can be specified. Therefore, the accuracy of the position estimation improves.

The position estimation apparatus also estimates positions such that the distance of two estimated positions is less than a threshold, based on the distributions of estimated positions of a first target sensor node and a second target sensor node within a communication-cable range by one hop. With the relative positional relation between two sensor nodes, the positions of sensor nodes can be estimated more accurately.

The position estimation apparatus also specifies the positions of sensor nodes requiring that the distance between two sensor nodes in a communicable range by one hop be less than the threshold. In this way, the position of a sensor node can be estimated more accurately.

The position estimation apparatus randomly generates a given number of times, information concerning the positions of sensor nodes within a given region and searches for a path from a selected position to a base device. The position estimation apparatus detects hops along the path and derives frequencies of distances corresponding to each hop. A distribution of estimated distances is a frequency of distances. As a result, a distribution of distances corresponding to each hop can be obtained even if the exact position of a sensor node is unknown. Therefore, the position of the target sensor node is estimated more accurately.

As mentioned above, sensor nodes may be disposed randomly within a given region depending on the shape of the given region. Thus, distances corresponding to each hop along the path between a sensor node and a base device are not equal. To address this situation, the position estimation apparatus derives frequencies of each distance corresponding to each hop. The distribution of estimated distances stored in the storage device is a distribution representing a frequency of distances. As a result, a distribution of distances corresponding to each hop can be obtained even if the exact position of sensor nodes is unknown. Therefore, the position of the target sensor node can be estimated more accurately.

The position estimation method in the present embodiments can be implemented by a computer, such as a personal computer and a workstation, executing a program that is prepared in advance. The position estimation program is recorded on a computer-readable recording medium such as a hard disk, a flexible disk, a CD-ROM, and a DVD, and is executed by being read out from the recording medium by a computer. The program can be distributed through a network such as the Internet.

According to an aspect of the embodiments, the accuracy of estimation of the position of a communication device is improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A position estimation method performed by a computer that accesses a storage device, the method comprising:
  storing to the storage device, a probability distribution of
    distances corresponding to a hop along a path between a first communication device and a second communication device within a region;

acquiring total hops needed for data of the second communication device to reach the first communication device based on analysis of communications between the first communication device and the second communication device, wherein the total hops is larger than one;

calculating a probability distribution of distances corresponding to the total hops based on the total hops and the probability distribution of a hop stored in the storage device;

calculating a probability distribution of positions within the region based on the probability distribution of distances, information concerning a range of the region, and information concerning a position of the first communication device;

calculating, based on a sum of the probability distribution of positions, an index that indicates a probability of presence of the second communication device; and deriving an estimated position of the second communication device from the index, wherein in the deriving, a first estimated position of the second communication device and a second estimated position of another second communication device are derived such that a distance between the first estimated position and the second estimated position is less than a threshold, based on an index for the second communication device and an index for the another second communication device where the another second communication device is in a range of one hop from the second communication device.

2. The position estimation method according to claim 1, wherein the storage device stores, for each hop, the probability distribution of distances corresponding to a hop, in the calculating of a probability distribution of distances, the probability distribution of distances corresponding to the total hops is calculated based on a sum of the probability distribution of a hop.

3. The position estimation method according to claim 1, wherein in the deriving, an estimated position where the probability of presence of the second communication device is maximal is derived from the index.

4. The position estimation method according to claim 1, wherein in the deriving, a position where the indexes become maximal are derived.

5. A position estimation method performed by a computer that accesses a storage device, the method comprising:

storing to the storage device, a probability distribution of distances corresponding to a hop along a path between a first communication device and a second communication device within a region;

acquiring total hops needed for data of the second communication device to reach the first communication device based on analysis of communications between the first communication device and the second communication device, wherein the total hops is larger than one;

calculating a probability distribution of distances corresponding to the total hops based on the total hops and the probability distribution of a hop stored in the storage device;

calculating a probability distribution of positions within the region based on the probability distribution of distances, information concerning a range of the region, and information concerning a position of the first communication device;

calculating, based on a sum of the probability distribution of positions, an index that indicates a probability of presence of the second communication device; and deriving an estimated position of the second communication device from the index, wherein in the deriving, estimated positions of a plurality of the second communication devices are derived based on indexes of the second communication devices under a condition that two estimated positions are in a range of one hop and a distance of the two estimated positions is less than a threshold.

6. The position estimation method according to claim 5, wherein in the deriving, estimated positions of the second communication devices yielding the maximal probability are derived.

7. The position estimation method according to claim 1, wherein the computer or another computer performs:

generating randomly and multiple times, positional information concerning a position of the second communication device within the region;

searching for a path from a position indicated by selected positional information, to the first communication device;

detecting a distance corresponding to a hop along the path, based on the positional information of the second communication device on the path and the information concerning a position of the first communication device; and deriving a detection frequency of each detected distance, wherein the provability distribution of distances stored in the storage device is the detection frequency of each detected distance.

8. The position estimation method according to claim 2, wherein the computer or another computer performs:

generating randomly and multiple times, positional information concerning a position of the second communication device within the region;

searching for a path from a position indicated by selected positional information, to the first communication device;

detecting a distance corresponding to a hop along the path, based on the positional information of the second communication device on the path and the information concerning a position of the first communication device; and deriving a detection frequency of each detected distance, wherein the provability distribution of distances stored in the storage device is the detection frequency of each detected distance.

9. A system comprising:

first communication devices placed at given positions;

a second communication device and another second communication device that are placed within a region and communicate with the first communication devices directly or via another communication device;

a third communication device that includes:

a storage device that stores information received from the first communication device, and a processing device that processes the information stored in the storage device, wherein the processing device:

stores to the storage device, a distribution of estimated distances corresponding to a hop on a path from a second communication device to a first communication device, acquires, for each first communication device, total hops needed for data from the second communication device to reach the first communication device, wherein the total hops is larger than one, calculates, for each first communication device, a distribution of estimated distances corresponding to the total hops, based on the total hops and the distribution of estimated distances corresponding to a hop stored in the storage device, calculates a distribution of estimated positions within the region, based on the distributions of estimated distances corresponding to the total hops, information concerning a range of the region, and information concerning positions of the first communication devices, calculates, based on a sum of the distributions of estimated positions, an index that indicates a probability of a position of the second communication device, and derives an estimated position of the second communication device, based on the index, wherein a first estimated position of the second communication device and a second estimated position of the another second communication device are derived such that a distance between the first estimated position and the second estimated position is less than a threshold, based on an index for the second communication device and an index for the another second communication device where the another second communication device is in a range of one hop from the second communication device.

10. A position estimation apparatus comprising:

a storage device that stores information received from first communication devices placed at given positions; and a processing device that processes the information stored in the storage device, wherein a second communication device and another second communication device communicate with the first communication devices directly or via another communication device, the storage device stores a distribution of estimated distances corresponding to a hop on a path from a second communication device to a first communication device, and the processing device acquires, for each first communication device, total hops needed for data from the second communication device to reach the first communication device, wherein the total hops is larger than one, calculates, for each first communication device, a distribution of estimated distances corresponding to the total hops, based on the total hops and the distribution of estimated distances corresponding to a hop stored in the storage device, calculates a distribution of estimated positions within a region, based on the distribution of estimated distances corresponding to the total hops, information concerning a range of the region, and information concerning positions of the first communication devices, calculates, based on a sum of the distribution of estimated positions, an index that indicates a probability of a position of the second communication device, and derives an estimated position of the second communication device based on the index, wherein a first estimated position of the second communication device and a second estimated position of the another second communication device are derived such that a distance between the first estimated position and the second estimated position is less than a threshold, based on an index for the second communication device and an index for the another second communication device where the another second communication device is in a range of one hop from the second communication device.

* * * * *